United States Patent
Singh et al.

(10) Patent No.: US 8,572,532 B1
(45) Date of Patent: Oct. 29, 2013

(54) COMMON PATH PESSIMISM REMOVAL FOR HIERARCHICAL TIMING ANALYSIS

(75) Inventors: Sushobhit Singh, Uttar Pradesh (IN); Amit Kumar, Uttar Pradesh (IN); Oleg Levitsky, San Jose, CA (US); Akash Khandelwal, Cupertino, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/487,157

(22) Filed: Jun. 1, 2012

Related U.S. Application Data

(63) Continuation of application No. 12/708,530, filed on Feb. 18, 2010, now Pat. No. 8,365,113, which is a continuation-in-part of application No. 12/437,096, filed on May 7, 2009.

(60) Provisional application No. 60/265,705, filed on Dec. 1, 2009.

(51) Int. Cl.
*G06F 17/50* (2006.01)

(52) U.S. Cl.
USPC .......................................... 716/108; 716/107

(58) Field of Classification Search
USPC .................................................. 716/106–110
See application file for complete search history.

(56) References Cited

U.S. PATENT DOCUMENTS

| | | | |
|---|---|---|---|
| 8,086,989 B2 * | 12/2011 | Hailu et al. | 716/134 |
| 8,205,182 B1 * | 6/2012 | Zlatanovici et al. | 716/125 |
| 2003/0009727 A1 * | 1/2003 | Takeyama et al. | 716/1 |

* cited by examiner

*Primary Examiner* — Binh Tat
(74) *Attorney, Agent, or Firm* — Alford Law Group, Inc.

(57) ABSTRACT

A method of timing analysis of an integrated circuit (IC) design with a partition block including an original clock signal with a pair of clock paths having an external common point outside the block boundary is disclosed, including receiving a netlist of the partition block of a hierarchical IC design, analyzing a pair of clock paths having the external common point to determine first and second clock ports at the boundary of the partition block; and for the first and second clock ports, creating launch and capture clocks, making exclusive clock groups of the launch clock and the capture clock for opposing clock ports to avoid the launch and capture clocks for each port affecting other internal data paths within the partition block, and associating common path pessimism removal information with a source latency of the capture clock to adjust timing at an end point of the internal data path.

22 Claims, 18 Drawing Sheets

FIG. 13B

| HCPPRDB Key | | | DB CPPR Info | | |
|---|---|---|---|---|---|
| PORT1 | PORT2 | CLOCK1 | CLOCK2 | | |
| | | | LRCR | LRCF | LFCR | LFCF |
| Launch | Capture | Launch | Capture | | | | |
| Capture | Launch | Capture | Launch | | | | |

FIG. 14

```
create_clock -name clock_name_v -period 10 -waveform {0 5}
set_input_delay 2 -clock [get_clocks {clock_name_v}] [get_ports {A}]
set_output_delay 2 -clock [get_clocks {clock_name_v}] [get_ports {B}]
```

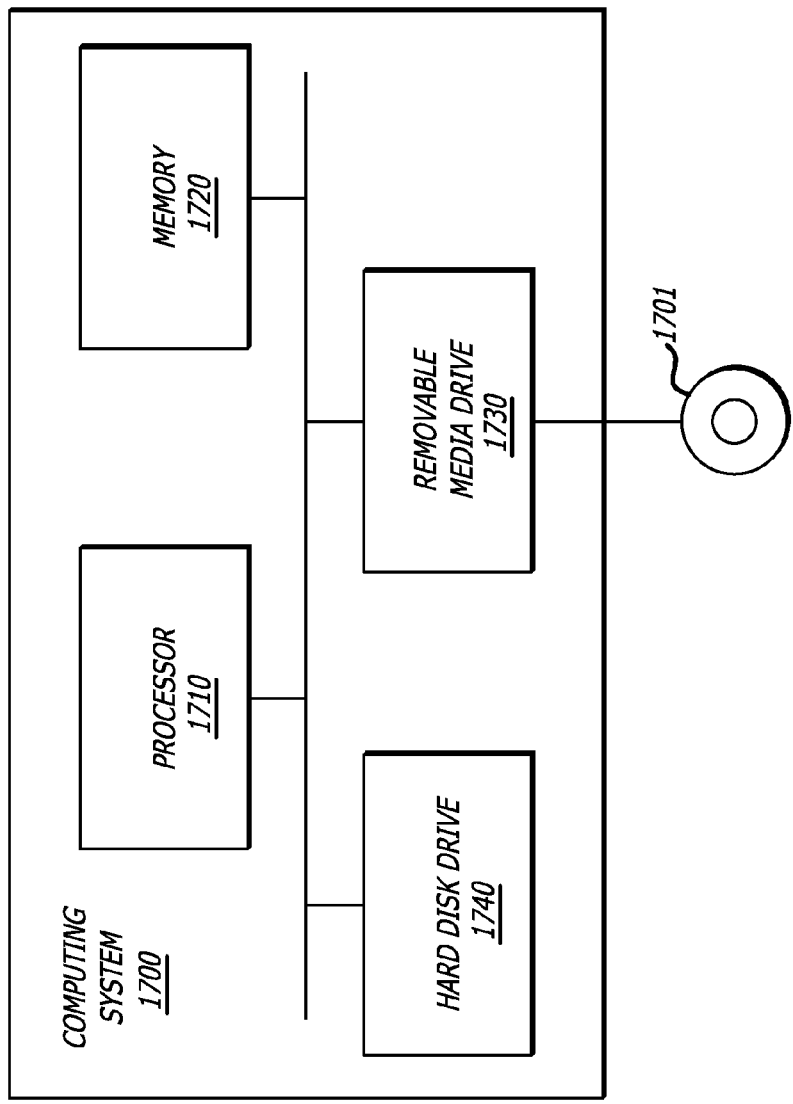

ically designing and analyzing timing in an
COMMON PATH PESSIMISM REMOVAL FOR HIERARCHICAL TIMING ANALYSIS

CROSS-REFERENCE TO RELATED APPLICATIONS

This United States (U.S.) patent application is a continuation in part and claims the benefit of U.S. patent application Ser. No. 12/708,530 entitled FLOW METHODOLOGY FOR SINGLE PASS PARALLEL HIERARCHICAL TIMING CLOSURE OF INTEGRATED CIRCUIT DESIGNS filed on Feb. 18, 2010 now U.S. Pat. No. 8,365,113 by inventors Vivek Bhardwaj et al. which in turn claims the benefit of U.S. Provisional Patent Application No. 60/265,705 entitled FLOW METHODOLOGY FOR SINGLE PASS PARALLEL HIERARCHICAL TIMING CLOSURE OF INTEGRATED CIRCUIT DESIGNS filed on Dec. 1, 2009 by inventors Vivek Bhardwaj et al.; and which is a continuation in part and claims the benefit of pending U.S. patent application Ser. No. 12/437,096 entitled USER INTERFACE FOR TIMING BUDGET ANALYSIS OF INTEGRATE CIRCUIT DESIGNS filed on May 7, 2009 by inventors Vivek Bhardwaj et al., incorporated by reference and pending U.S. patent application Ser. No. 11/621,915, entitled SYSTEM AND METHOD OF GENERATING HIERARCHICAL BLOCK-LEVEL TIMING CONSTRAINTS FROM CHIP-LEVEL TIMING CONSTRAINTS filed by Levitsky et al. on Jan. 10, 2007, hereby incorporated by reference.

This patent application hereby further incorporates by reference U.S. Pat. No. 7,467,367 entitled METHOD AND SYSTEM FOR CLOCK TREE SYNTHESIS OF AN INTEGRATED CIRCUIT filed by inventors Li et al., issued on Dec. 16, 2008; and U.S. patent application Ser. No. 11/766,775 entitled METHOD AND APPARATUS FOR CIRCUIT SIMULATION USING PARALLEL COMPUTING filed by inventors Athanasius W. Spyrou on Jun. 12, 2007, pending.

FIELD OF THE INVENTION

The embodiments of the invention generally relate to design methods for achieving timing closure of integrated circuit designs.

BACKGROUND

The design of integrated circuit chips continues to evolve from the original concept of having more than one function on a chip to a complete system of components on a chip. Fabrication technology continues to rapidly decrease the design features size and increase the manufacturability size of a chip. This enables a large number of functions available to a designer to incorporate on a chip. Designers then, have the ability to create systems on an IC that are increasingly more complex and require a high-level design language in order to build, verify and test integrated circuit systems.

The task of designing these integrated circuits is also very complex and time consuming, involving synthesizing, analyzing and optimizing many circuit parameters. Because of this complexity, electronic design automation (EDA) systems have been developed to assist designers in developing integrated circuit designs at multitude levels of abstraction.

To ease the design of a complex integrated circuit, design tasks may be divided up into multiple functional blocks with a plurality of levels of hierarchy. However, dividing up an integrated circuit design into multiple blocks and hierarchical levels can complicate the evaluation of the overall circuit design. Moreover an integrated circuit design may be so large in size or scale (e.g., 1 million gates or more), each partition may have numerous signal paths (e.g., hundreds of thousands of signal paths for data, address, control, and clock signals) and numerous input, output, or input/output ports (e.g., thousands of ports).

With giga gate (e.g., 1 billion gates or more) scale integrated circuit designs, robust hierarchical solutions to analyzing integrated circuit designs become even more important. Limits of computer capacity have bound chip designers to implement giga gate chip designs hierarchically. However, dividing the semiconductor chip hierarchically and implementing it through software is a complex and involved process. The added prototyping complexity involved can be justified if the implementation process yields quick turnaround times without extra iterations or repetition in the design flow process. With a giga gate chip design, hierarchical design becomes the preferred choice, but fast turnaround times in chip closure remains a factor to reckon with.

Timing budgets for data paths are usually automatically generated in early design stages when the integrated circuit design may be incomplete or have errors so that generated timing budgets may require manual correction and analysis. The process of automatic timing budgeting is usually focused on worst case scenarios i.e., overly pessimistic that may lead to errors. The timing budgeting for blocks or partitions are specifically an issue due to multiple paths that must be analyzed that may share a common input and output.

As the complexity of designing integrated circuits continues to push the limits of the design software infrastructure, the high level description languages may need to change in order to minimize the limitations/burden to the designer. The embodiment of this invention expands the capability of the design tools for the designers of integrated circuits such that timing goals of an integrated circuit design may be met.

SUMMARY OF THE INVENTION

The embodiments of the invention are best summarized by the claims. However in brief, embodiments of the invention provide a method of designing and analyzing timing in an integrated circuit design. The method includes receiving a first netlist of a first partition block for a top level of a hierarchical design of an integrated circuit, the first partition block including at least one original clock signal with a pair of clock paths having an external common point outside a boundary of the first partition block; analyzing the pair of clock paths having the external common point to determine a first clock port and a second clock port associated with a first original clock signal at the boundary of the first partition block; and for each of the first clock port and the second clock port, creating a launch clock and a capture clock, making exclusive clock groups for each of the launch clock for one clock port and the capture clock for the other clock port to avoid the launch clock and the capture clock for each port affecting any other internal data path within the first partition block, and associating common path pessimism removal (CPPR) information for the first partition block with a source latency of the capture clock so that timing is adjusted at an end point of an internal data path.

BRIEF DESCRIPTION OF THE DRAWINGS

The present invention is illustrated by way of example, and not limitation, in the figures of the accompanying drawings in which like references indicate similar elements and in which:

FIG. 13B illustrates a table depicting CPRR adjustment information that can be stored into a data base with a key.

FIG. 14 illustrates exemplary constraints for a given design of a partition block or module with a launch and capture clock formed per clock per input phase.

FIG. 17 illustrates a computing system that may be used to perform some or all of the processes in accordance with several of the embodiments of the invention.

DETAILED DESCRIPTION

Figure 1:
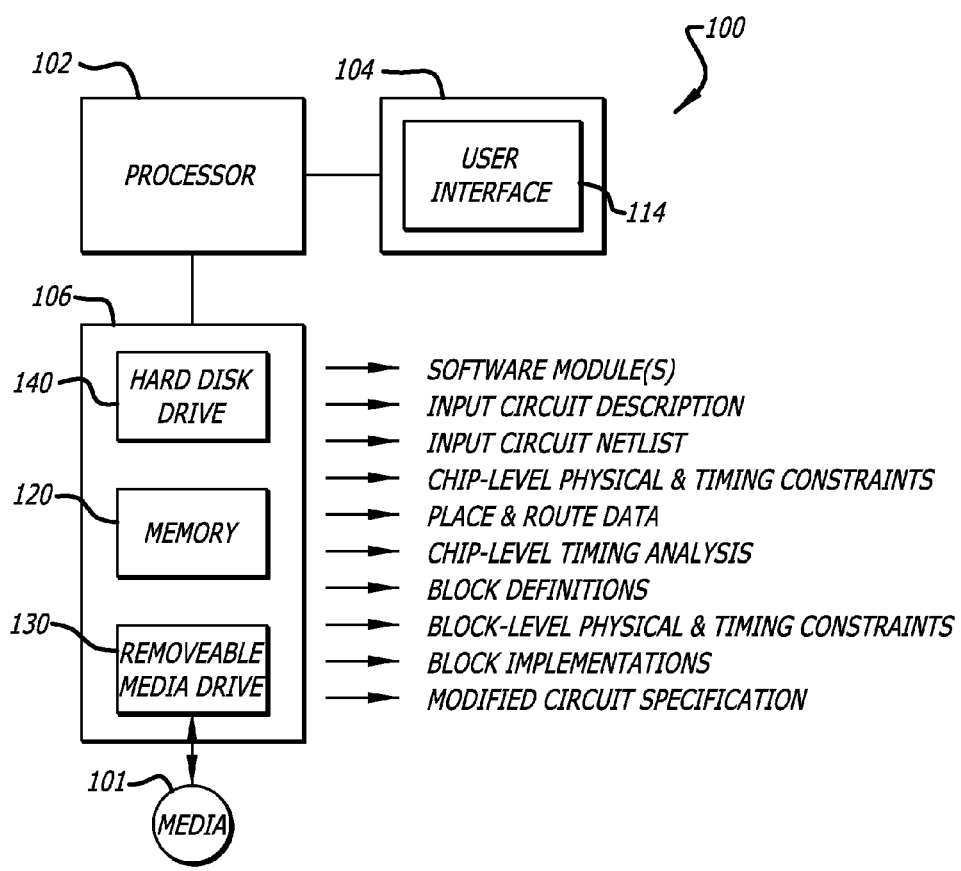
FIG. 1 illustrates a block diagram of an exemplary system for designing integrated circuits including a design flow for timing closure.

In the following detailed description of the embodiments of the invention, numerous specific details are set forth in order to provide a thorough understanding of the aspects of the invention. However, it will be obvious to one skilled in the art that the embodiments of the invention may be practiced without these specific details. In other instances well known methods, procedures, components, and circuits have not been described in detail so as not to unnecessarily obscure aspects of the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

INTRODUCTION

The embodiments of the invention facilitate hierarchical timing analysis of a hierarchy of functional blocks or modules on an integrated circuit design. The total chip level delay time or arrival time of data signals and clock signals is budgeted in the hierarchy so that functional blocks or modules can be independently designed with their respective block budget timing while the overall chip timing at the chip level is met when all the blocks are assembled together.

Independent timing closure of blocks in large hierarchical integrated circuit designs becomes more difficult as clock frequencies increase. In such high frequency designs, it is important to get accurate timing analysis results. Common path pessimism removal (CPPR) is one technique that may be used to improve accuracy of timing analysis of the overall chip timing of an integrated circuit at chip level. It is desirable to similarly utilize common path pessimism removal at the block level for each partition block/module of the integrated circuit design to improve timing results at the block level as well. However, pushing the constraints and path exceptions from chip level to the partition block/module level for common path pessimism removal is a challenge.

Time budgeting is used for generating the constraints and path exceptions for timing closure of hierarchical blocks. However the constraints generated in such flow can be overly pessimistic leading to inaccurate timing analysis at the block level. This occurs when a common point for the clock paths that are used by CPPR techniques to reduce pessimism of the clock network is outside of the block being analyzed. For example, the common point 1237 for clock paths 1251B, 1251C, 1251X is outside block 1210.

This causes the block level analysis to become pessimistic which can lead to a greater effort during timing optimization and an over design of the logic within the block; greater area usage for the block within the integrated circuit; increased turn around time to implement the block into a gate netlist; and greater time to time to market of the overall integrated circuit design to overcome the overly pessimistic timing results.

Generally, the solution uses a pair of clocks at a pair of interface ports, and four CPPR block values to export information from the chip level to the block level for analysis. A hierarchical CPPR data base is used to efficiently specify and apply the information to the timing engine to perform the block level analysis with CPPR techniques.

The time budgeting of clock signal timing and data signal timing between functional blocks or modules of an integrated circuit design is part of the time budgeting flow or methodology. Time budgeting divides the time for a data signal to propagate along the data path across block boundaries. Time budgeting also divides the time for the clock signal (clock division) to propagate along the clock paths across block boundaries.

The embodiments of the invention allow information associated with CPPR at the chip level to be used in a hierarchical manner so that time budgeting and timing analysis can be performed hierarchically at the block level during the design thereof and at the chip level when assembly the block level timing information together.

Time budgeting of data paths (data time budgeting) was described previously in U.S. patent application Ser. No. 11/621,915, entitled SYSTEM AND METHOD OF GENERATING HIERARCHICAL BLOCK-LEVEL TIMING CONSTRAINTS FROM CHIP-LEVEL TIMING CONSTRAINTS filed by Levitsky et al. on Jan. 10, 2007, and U.S. Patent Application No. 61/265,705, entitled FLOW METHODOLOGY FOR SINGLE PASS PARALLEL HIERARCHICAL TIMING CLOSURE OF INTEGRATED CIRCUITS files by Bhardwaj et al. on Dec. 1, 2009 are hereby incorporated by reference. U.S. patent application Ser. No. 11/621,915 and 61/621,705 describe embodiments that generate block-level timing constraints of data paths for each block-level circuit that may be used to budget timing within an integrated circuit design to functional modules or blocks as part of the timing budgeting process. Timing budgeting of the data paths allows partitioning an integrated circuit design into separate blocks or modules (partitions) and performing a stand alone optimization of each based on the generated constraints, including timing constraints.

Timing budgeting is a part of the block implementation/design in the IC design flow or sequence that allows generating timing and physical constraints for each partition (e.g., module, block, etc.) of an integrated circuit design, prior to completing the physical design.

For clock time budgeting, a total chip clock delay at the top level of hierarchy is divided up amongst the partitions in parallel with the data time budgeting of the data signal paths. Given a clock delay number that represents a delay within the block, the time budgeting module breaks the total chip clock delay into external clock delay and internal clock delay across the partition boundary. The time budgeting module defines the external clock delay as a source latency in the block constraint file. The budgeting module defines the internal clock delay as a network latency in the block constraint file. The budgeting module further defines or puts the internal clock delay number in the block timing model.

A high level logic synthesis tool translates a high level description of a circuit into a gate level netlist and maps logic gates of a cell library therein to form a flattened gate level netlist of the entire circuit, referred to as a chip netlist or a chip-level netlist. A timing analysis with a timing simulator may be used to verify that chip level timing constraints are being met by the chip level netlist. Partitioning and timing budgeting may be performed on the chip level netlist. With the chip level netlist being partitioned and timing budgeting performed, further implementation by logic synthesis and timing analysis may be independently applied to a hierarchy of an integrated circuit design.

In one embodiment of the invention, a method of timing analysis of an integrated circuit design is disclosed. The method includes receiving a first netlist of a first partition block for a top level of a hierarchical design of an integrated circuit, the first partition block including at least one original clock signal with a pair of clock paths having an external common point outside a boundary of the first partition block; analyzing the pair of clock paths having the external common point to determine a first clock port and a second clock port associated with a first original clock signal at the boundary of the first partition block; and for each of the first clock port and the second clock port, creating a launch clock and a capture clock, making exclusive clock groups for each of the launch clock for one clock port and the capture clock for the other clock port to avoid the launch clock and the capture clock for each port affecting any other internal data path within the first partition block, and associating common path pessimism removal (CPPR) information for the first partition block with a source latency of the capture clock so that timing is adjusted at an end point of an internal data path.

In another embodiment of the invention, a system for designing and analyzing an integrated circuit design is disclosed. The system includes a processor to execute instructions; and a storage device coupled to the processor. The storage device stores instructions that when executed cause the processor to perform the operations of providing a hierarchical common path pessimism removal (CPPR) data base including CPPR adjustment information associated with a source latency of a capture clock of a clock port so that timing can be adjusted at an end point of an internal data path of one or more partition blocks; querying the hierarchical CPPR data base for CPPR adjustment information associated with a clock port of a respective block of the one or more partition blocks; and adjusting timing of an internal data path ending at a sink or end point of the respective block in response to the CPPR adjustment information to more accurately analyze timing of the respective block.

In still another embodiment of the invention, a machine readable product for designing and analyzing an integrated circuit design is disclosed. The machine readable product comprises a machine readable storage device having stored therein machine readable instructions. The machine readable instructions, when executed by a machine such as a processor, the machine performs operations including providing a hierarchical common path pessimism removal (CPPR) data base including CPPR adjustment information associated with a source latency of a capture clock of a clock port so that timing can be adjusted at a sink or end point of an internal data path of one or more partition blocks; querying the hierarchical CPPR data base for CPPR adjustment information associated with a clock port of a respective block of the one or more partition blocks; and adjusting timing of an internal data path ending at a sink or end point of the respective block in response to the CPPR adjustment information to more accurately analyze timing of the respective block.

In still another embodiment of the invention, machine readable instructions, when executed by a machine, such as a processor, perform operations including receiving a first netlist of a first partition block for a top level of a hierarchical design of an integrated circuit, the first partition block including at least one original clock signal with a pair of clock paths having an external common point outside a boundary of the first partition block; analyzing the pair of clock paths having the external common point to determine a first clock port and a second clock port associated with a first original clock signal at the boundary of the first partition block; and for each of the first clock port and the second clock port, creating a launch clock and a capture clock, making exclusive clock groups for each of the launch clock for one clock port and the capture clock for the other clock port to avoid the launch clock and the capture clock for each port affecting any other internal data path within the first partition block, and associating common path pessimism removal (CPPR) information for the first partition block with a source latency of the launch clock so that timing is adjusted at an end point of an internal data path.

Circuit Design System

FIG. 1 illustrates a block diagram of an exemplary circuit design system 100 for designing integrated circuits in accordance with an embodiment of the invention. The circuit design system 100 is capable of generating timing constraints for individual hierarchical blocks of an integrated circuit that are derived from the chip-level timing constraints and analysis. Using the chip-level timing constraints and analysis, the circuit design system 100 is capable of generating block-level timing constraints for module or block-level circuits as well as other constraints for time budgeting. The block-level timing constraints may be in the form of one or more logical timing constraint points associated with ports of a block-level circuit. The block-level timing budgeting data may be propagated to the timing budgeting data of other modules and blocks in the hierarchy of the integrated circuit so that when the blocks are finally assembled together to form the entire chip, timing closure for the entire chip can be achieved.

The circuit design system 100 may be configured as one or more computer systems comprising one or more processors 102, an input/output interface 104, and one or more storage devices 106. The one or more processors 102 may be any type of data processing device, including microprocessors, microcontrollers, reduced instruction set computer (RISC) processors, networked computer systems, etc. or a specialized processor for performing integrated circuit design. The one or more storage devices 106 may be any one or more computer readable mediums include memory devices 120, storage media 101 readable by a removable media drive 140, and/or a hard disk drive 140 (e.g., RAM, ROM, magnetic hard disks, optical storage discs, etc.) for storing one or more software modules of instructions that control the processor 102 to perform its various operations. The one or more storages devices 106 may store information (e.g., circuit netlist, constraints, etc.) as well that the processor 102 uses in performing the circuit design process described herein. Such information may include the input circuit description specified by a user, the input circuit netlist generated by a logic synthesis operation, the chip-level physical and timing constraints, place and route data including chip-level timing analysis generated by a place and route operation, block definitions including block-level physical and timing constraints generated by a chip partitioning operation, block implementations generated by a block implementation operation, and the modified circuit specification generated by a chip assembly and top-level implementation operation, and verified by a circuit sign-off verification operation. Use of a plurality of computer systems over a network for circuit simulation of blocks in parallel is further described in U.S. patent application Ser. No. 11/766,775 entitled METHOD AND APPARATUS FOR CIRCUIT SIMULATION USING PARALLEL COMPUTING filed by inventors Athanasius W. Spyrou on Jun. 12, 2007, Under the control of instructions of one or more software modules stored in the one or more storage devices 106, the one or more processors 102 may perform the various operations of the circuit design system 100, including logic synthesis, chip-level floor planning, place and route, chip partitioning, block implementation, top-level implementation, chip assembly, and circuit sign-off verification.

The input/output interface 104 allows a user to send and receive information to and from the processor 102, as well as control the various operations performed by the processor 102. For example, the input/output interface 104 may comprise one or more input devices, such as a keyboard, a pointing device (e.g., a mouse, a track ball), a touch-sensitive display, microphone, etc. The input/output interface 104 may also comprise one or more output devices, such as a display (including a touch-sensitive display) driven by a graphics generator, speakers driven by an audio generator, etc.

Using the one or more input devices of the input/output interface 104, a user may specify an input circuit description in any of a number of formats, including in a hardware description language (HDL), such as VHDL or Verilog, or in a resistor-transistor logic (RTL) language. Using one or more output devices of the input/output interface 104, a user may view the results of the circuit design operation performed by the processor 102. The user may also control the circuit design operations performed by the processor 102 using the input/output interface 104.

The timing budgeting graphical user interface (GUI) 114 is displayed graphically in a graphics window on a display device (one of the input/output devices 104, e.g., liquid crystal display or cathode ray tube display) for viewing by a user and to interact with the user using other input devices (e.g., a mouse, with mouse buttons, and a graphical pointer generated by a graphics generator). Instructions stored in the one or more storage devices 106, when executed by the processor 102, may generate the timing budgeting graphical user interface (GUI) 114 for one or more blocks/modules in response to one or more of the partitioning of the chip level netlist, chip-level design constraints (e.g., timing constraints, physical constraints, etc.), a timing library for the standard circuit cells in the IC design, timing models for macros/black boxes in the IC design, if any, a chip floorplan, and an initial placement data of cells and an initial route data of wire nets, if available.

Chip Hierarchy

Figure 7:
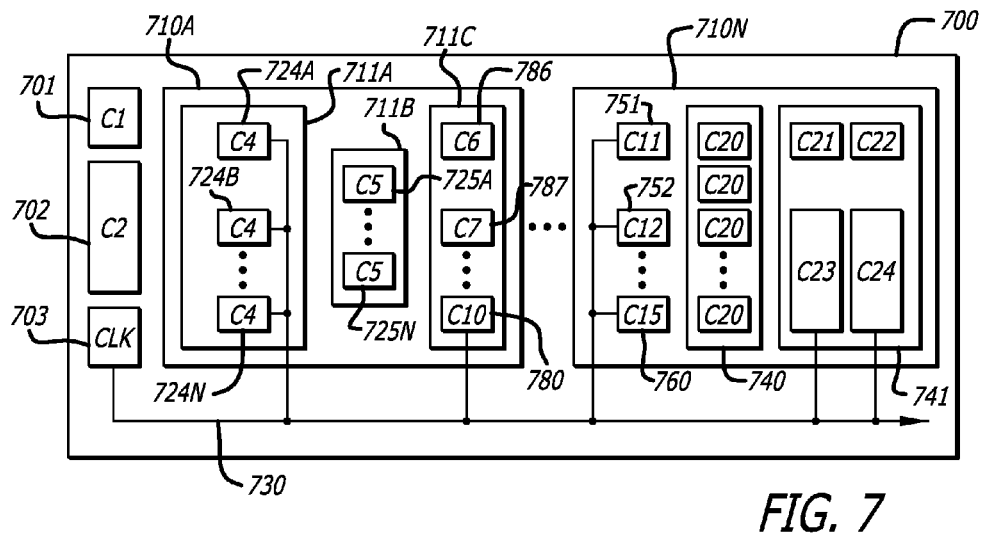
FIG. 7 illustrates a block diagram of an exemplary integrated circuit design depicting an exemplary hierarchy of instantiation.
Figure 8:
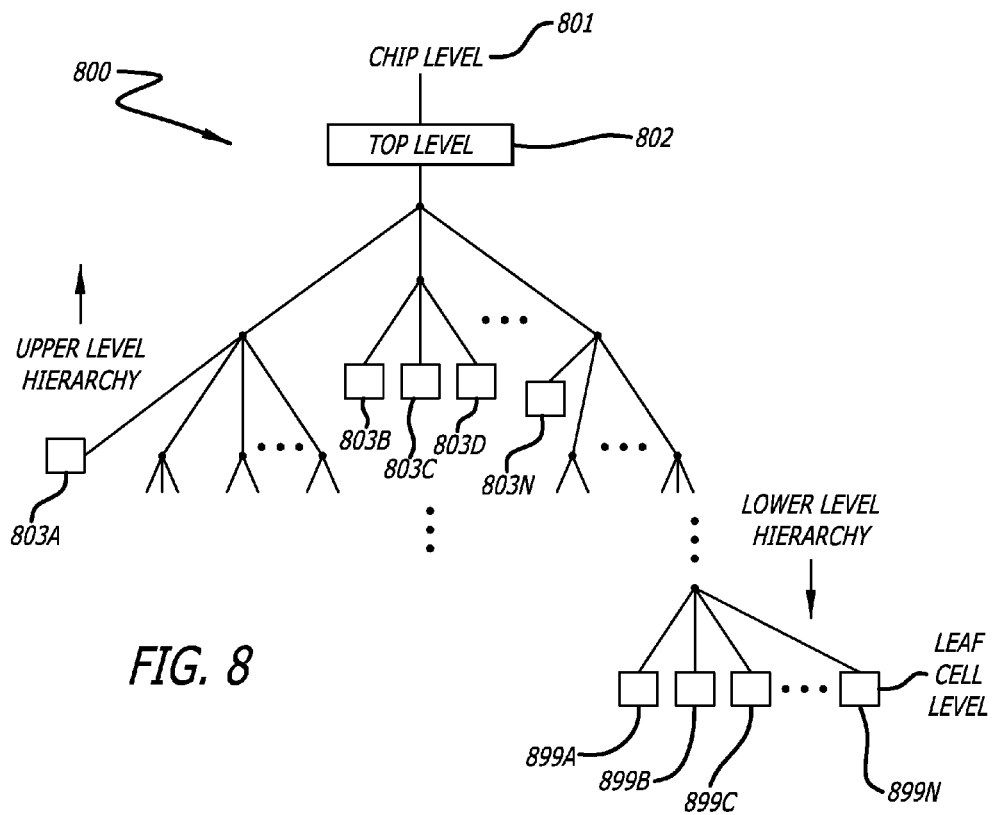
FIG. 8 illustrates an exemplary tree diagram of an integrated circuit design illustrating different levels of hierarchy.

Referring now to FIG. 7, the embodiments of the invention are used to design an integrated circuit, such as an exemplary integrated circuit 700. The integrated circuit 700 can be represented in a number of different ways such as a flattened chip or a tree hierarchy of different levels of circuits. One representation of the integrated circuit 700 is by a hierarchical netlist with different levels of hierarchy including a top level with one or more types of partitions (e.g., macro-blocks, modules or partitions (also referred to as upper-level blocks), blocks, sub-blocks, and leaf-cells or gates) at lower block levels instantiated therein. The levels of hierarchy often include a top level 802; one or more block-levels 803A-803N, and a cell, gate or leaf level 899A-899N as illustrated in the exemplary hierarchy tree of FIG. 8. The cells at the leaf level 899A-899N of hierarchy may include transistors that may make up one or more logical gates.

The top-level 802 of the hierarchy of the integrated circuit 700 may include one or more cells 701-703, one or more upper-level blocks 710A-710N, and top level interconnect 730, for example. At the one or more block levels 803A-803N, the upper level block 710A may include one or more lower level blocks 711A-711C. At the one or more block levels 803A-803N, the upper level block 710N may include one or more cells 751-760 and one or more lower level blocks 740-741. The lower level blocks may include additional blocks or leaf cells at leaf cell levels 899A-899N. For example, blocks 711A-711C respectively include leaf cells 724A-724N; leaf cells 725A-725N, and leaf cells 726-730. In a block, the same leaf cell may be instantiated numerous times, such as a D flip flop to make up a register, for example. In block 711A, the same cell C4 is instantiated N times as leaf cells 724A-724N. In another block, different leaf cells may be instantiated depending upon the desired logical functionality.

Alternatively, the integrated circuit 700 may be represented by a flattened chip level netlist of leaf-cells or gates without any added levels of hierarchy. Instead of a block level hierarchy, a flattened netlist may be used so that all design details of the integrated circuit are visible at the chip level 801.

A flattened chip level netlist of an integrated circuit 700 is typically used to perform chip-level timing analysis as entire data paths with their delay elements are more visible. However, timing closure by an EDA tool may be more difficult to obtain with a flattened chip level netlist on an entire integrated circuit. Additionally, one computer system is typically used to perform a timing analysis on a flattened chip level netlist, as it is difficult to share the computational load of a flattened chip level netlist with other networked computers. With a limited amount of computer resources, the time to perform a timing analysis of an entire integrated circuit chip may be quite long given today's complicated integrated circuits. In contrast with a hierarchical netlist of an integrated circuit, block-level timing analyses can be independently performed on a block by block basis using block level timing requirements and a top level timing analysis can be performed using the top level interconnect, models of the blocks, and top level circuitry, if any. The block-level timing analyses, the top level analyses, as well as timing budget generation and analyses, can be shared amongst a plurality of networked computer systems so that it can be performed independently in parallel and achieve timing results and timing closure for the overall integrated circuit chip sooner.

Figure 5:
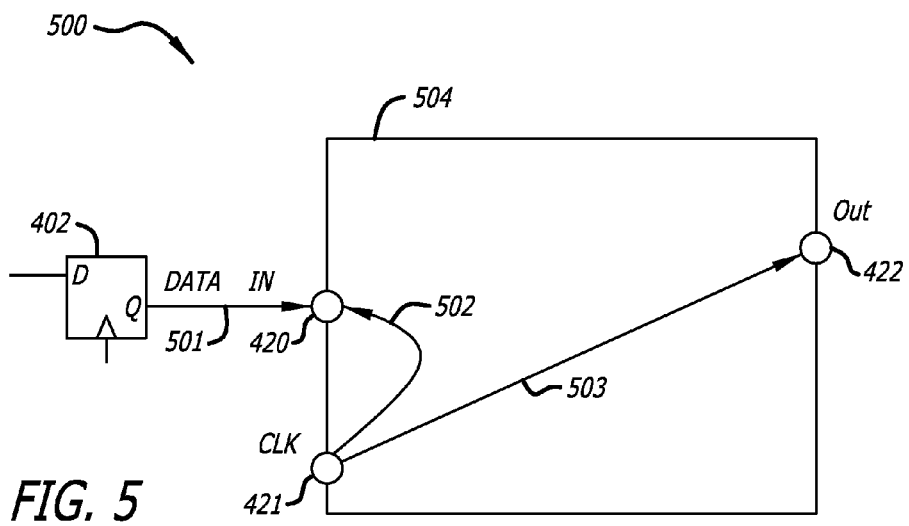
FIG. 5 illustrates a timing graph (timing model) of a data path and a clock path in the exemplary partition.
Figure 6:
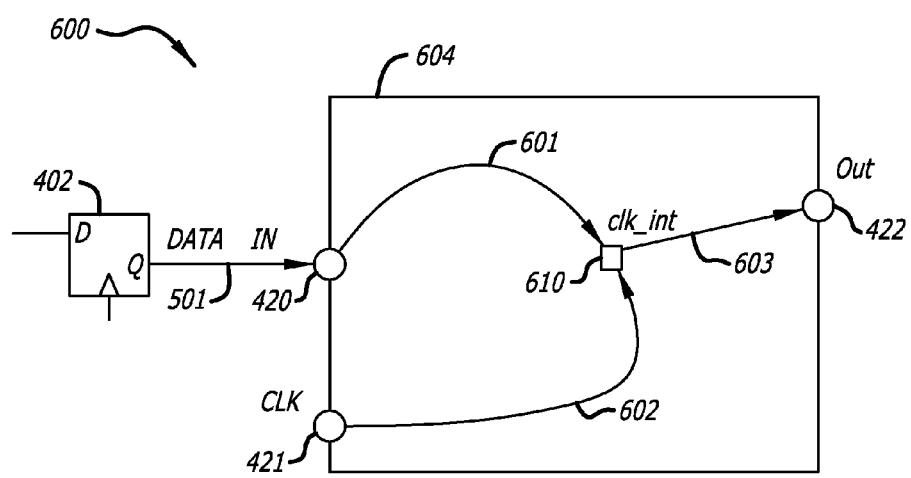
FIG. 6 illustrates a clock delay timing graph (timing model) of the data path and clock path in the exemplary partition to budget for clock timing in the partition.

To speed the timing analysis at the top level, the blocks may be modeled with a simple timing model, such as by a timing graph shown in FIGS. 5-6, for the purpose of analyzing timing at the top level. The more accurate the timing model of the blocks, the more accurate is the timing analysis of the top level of the integrated circuit.

The cell 703 may be a clock generator or clock buffer that generates a clock signal CLK 730 that is coupled into one or more partitions, blocks and cells at various levels of hierarchy in the chip. The clock signal 730 may experience various timing delays along the clock path before reaching a logic gate or register within a block. Exemplary timing delays in the clock path are described herein with reference to FIG. 4A and FIG. 9. Previously, the timing model for the blocks may have ignored the timing delays in the clock path or treated it uniformly. Embodiments of the invention provide a new timing model for the partitions, blocks, and cells that considers the timing delays in the clock paths to allow independent timing analysis between blocks and the top level and improve accuracy in the timing analysis thereof.

Software Module System

Figure 2A:
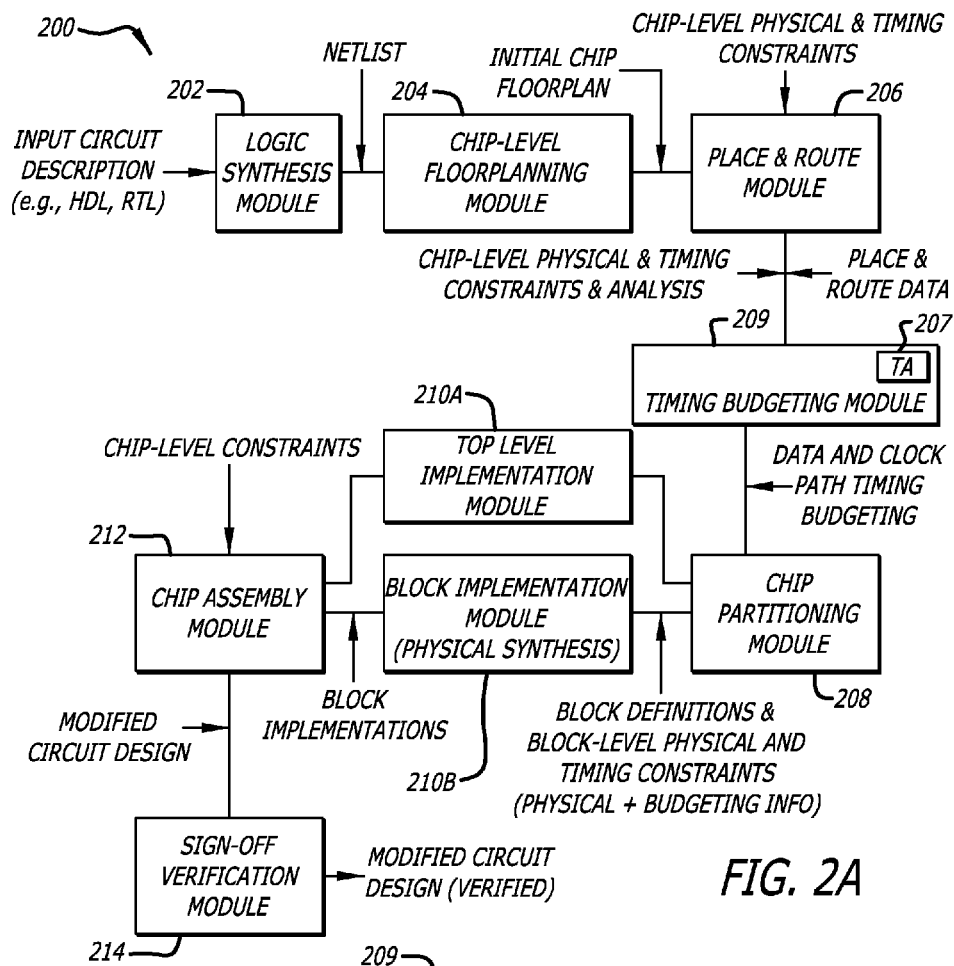
FIG. 2A illustrates a block diagram of exemplary software modules used in an exemplary integrated design system.

FIG. 2A illustrates a block diagram of an exemplary software suite 200 used by the circuit design system 100 in performing its circuit design function. The software suite 200 includes a logic synthesis module 202, a chip-level floor planning module 204, a place and route module 206, a chip partitioning module 208, a timing budgeting module 209, a top-level implementation module 210A in parallel with a block implementation module 210B, a chip assembly module 212, and a circuit sign-off verification module 214.

The logic synthesis module 202 generates a gate-level netlist from an input circuit description specified by a user using the input/output interface 104 (FIG. 1). The chip-level floorplanning module 204 generates an initial chip floorplan from the gate-level netlist.

The place and route module 206 generates an initial layout for the chip-level circuit using the initial chip floorplan and flat chip-level physical and timing constraints, and flat chip level timing constraints. The flat chip-level physical constraints and flat chip level timing constraints may be specified by a user using the input/output interface 104. Alternatively, the input/output interface 104 or other software module can generate flat chip-level timing constraints. This is ok.

Figure 2B:
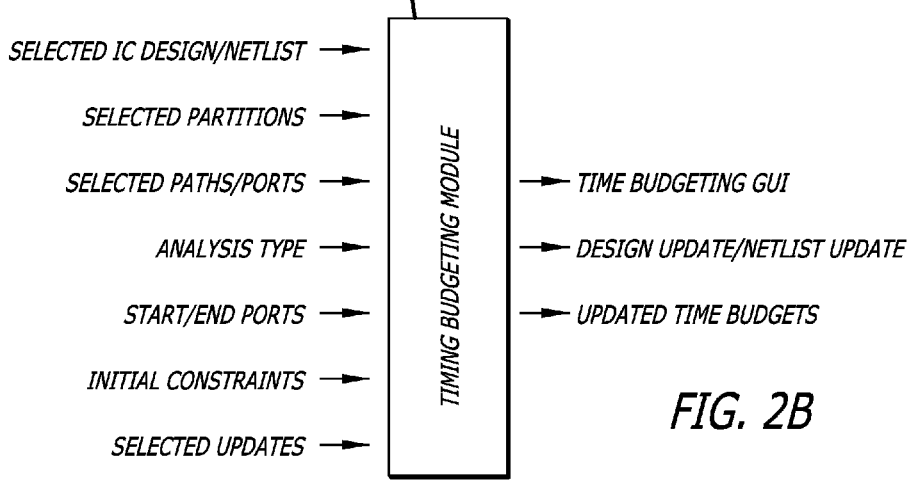
FIG. 2B illustrates a block diagram of an exemplary timing budgeting software module used in the exemplary integrated design system.
Figure 3:
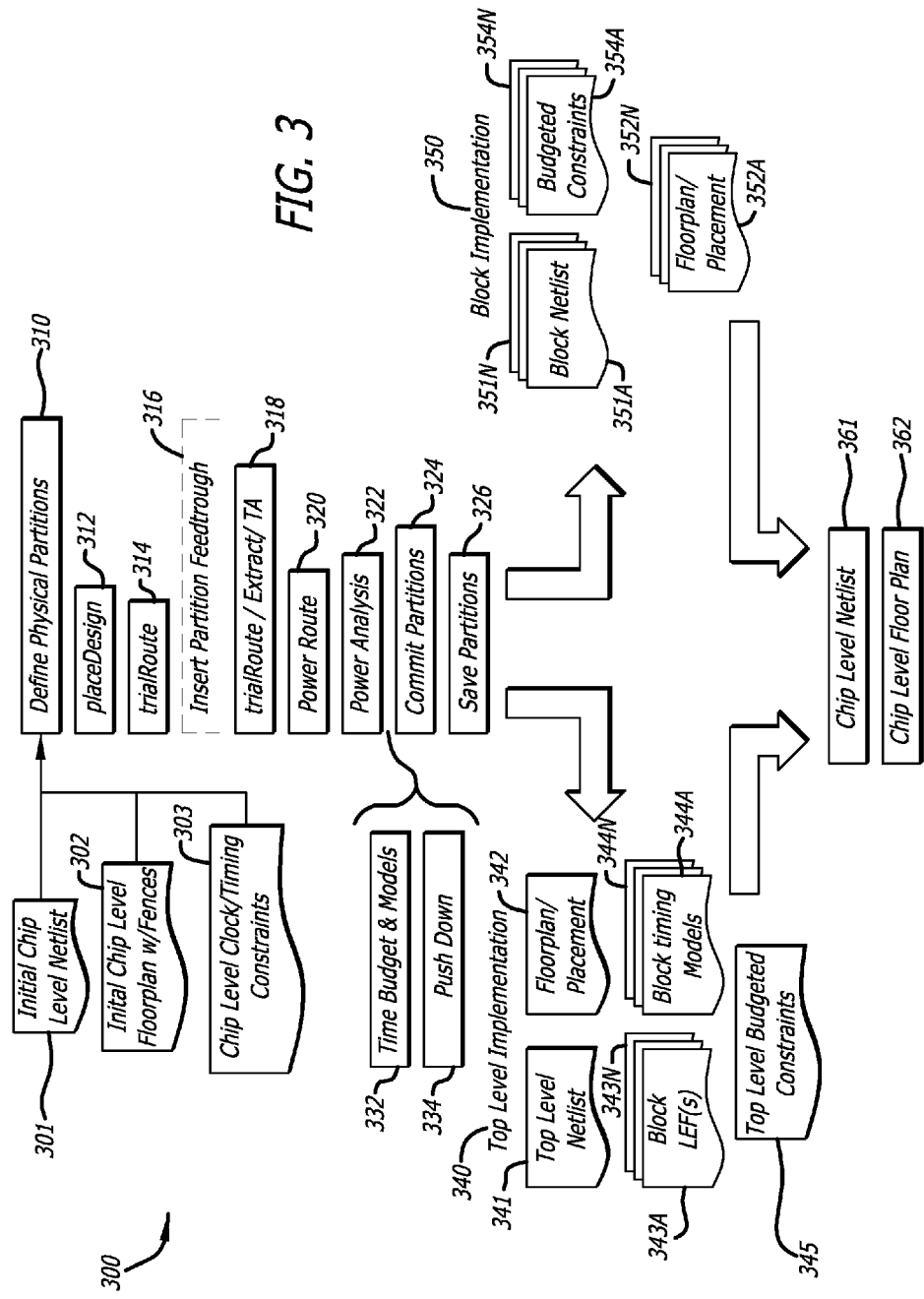
FIG. 3 illustrates an exemplary design methodology for timing closure of block level design and top level design of an integrated circuit.

FIG. 2B illustrates a block diagram of the timing budgeting software module 209 with exemplary input/outputs. The timing budgeting module 209 generates timing budgets independent of the physical partitioning in response to a timing budget command (deriveTimingBudget). The timing budgeting module 209 may include a timing analysis (TA) module 207 that is called by the timing budgeting module to calculate delays along one or more selected signal paths of an integrated circuit design. The timing budgeting module 209 automatically generates initial time budgets (both data timing budgets and clock timing budgets for each partition) and then analyzes and adjust the initial time budgets for the various levels of hierarchy and blocks in the integrated circuit design, prior to completion of the physical layout. Budgeting information can be saved with a budgeting command (saveTimingBudget) without saving the physical portions of the IC design. While the IC design is being partitioned, in response to a savePartition command, timing budgets may be saved concurrently with the saving of the partitions generated after the physical partitioning module 208 of the IC design.

The chip partitioning module 208 partitions the initial chip layout into a top level and various hierarchical block-level circuits, and generates block-level physical and timing constraints instantiated into the top level. In response to the flat chip-level physical constraints and flat chip level timing constraints, the chip partitioning module 208 generates the top-level physical constraints and top-level timing constraints as well as the block-level physical constraints and block-level timing constraints for each block-level partition.

The block top-level implementation module 210 generates block implementations from the block definitions and block 210A optimizes the top-level netlist in response to the top-level physical and constraints, the top-level timing constraints, and the timing models of the partition blocks generated by the timing budgeting module 209. The timing models of the blocks generated by the timing budgeting module 209 includes timing constraints for both data paths and clock paths in each partition block.

The block implementation module 210B optimizes the block-level netlists (also referred to as block level implementation) in response to the block definitions, the block-level physical constraints, and the block-level timing constraints. The block implementation module 210B and the top level implementation module 210A operate independent of each other so that the top level and the block partitions can be implemented concurrently in parallel.

The chip assembly module 212 assembles the block implementations, together merging them within the top-level to form a flat chip level implementation. The chip assembly module may further optimize the assembled flat chip level implementation using chip-level constraints to generate a modified circuit design.

The sign-off verification module 214 verifies that the modified circuit design performs to the specification of the integrated circuit design.

The chip partitioning module 208 can generate block-level timing constraints for data paths into each block-level circuit that are derived from the flat chip-level timing constraints and analysis. The block-level timing constraints for data paths are in the form of logical timing constraint points (hereinafter referred to as "logical TC points") at the data input and/or output ports of each defined block-level circuit where a data path crosses a partition boundary. Each logical TC point defines a clock source parameter for specifying a clock governing the propagation of data through a data path that passes through the block port, the delay parameter specifying a data propagation delay at the block port associated with a preceding or following block, and any applicable timing exceptions associated with the data path. Using the logical TC points, the block implementation module 210 performs timing analysis and/or optimization on the individual blocks to obtain implementations for the blocks. The derivation of the logical TC points from the chip-level timing constraints ensures that when the implemented blocks are subsequently assembled into the entire chip by the chip assembly and top level implementation module 210, timing closure for the entire chip can be achieved, and verified by the circuit sign-off verification module 212.

Clock ports are different from input and output data ports. A clock port is where a clock signal enters a partition block crossing over the partition boundary. More than one clock signal may enter a partition block so that different circuits may be clocked differently. There is one clock signal per clock port that may result in one or more clock paths between a clock source and one or more respective clock sinks within a partition block.

Clock Time Budgeting with Data Time Budgeting

The timing budgeting module 209 may automatically generate initial data timing budgets and clock timing budges for each partition block. The timing budgeting module 209 may also analyze and adjust the initial time budgets for the various levels of hierarchy and blocks in the integrated circuit design, prior to completion of the physical layout. U.S. patent application Ser. No. 11/621,915, entitled SYSTEM AND METHOD OF GENERATING HIERARCHICAL BLOCK-LEVEL TIMING CONSTRAINTS FROM CHIP-LEVEL TIMING CONSTRAINTS filed by Levitsky et al. on Jan. 10, 2007, incorporated by reference, describes embodiments that generate block-level timing constraints for the data paths in each block-level circuit. Chip level timing constraints are used to automatically generate the initial timing budgets for each of the partitions (e.g., functional modules or blocks) of an integrated circuit design as part of the timing budgeting process.

During the timing budget generation process, the timing budget analysis module 209 generates constraints (physical and timing constraints) for each partition, whether it is a module, a block, or other level of hierarchy in the integrated circuit design, including data path timing constraints and clock path timing constraints. An initial analysis is performed for each partition to determine their ports and check for false paths that may occur due to an improper assertion on the part. The false paths are saved in a first file (e.g., a warning file or .warn file) within a storage device. An initial timing budget analysis is performed to trace selected paths to generate detailed information regarding the path and how the initial timing budget information was automatically assigned. The detailed information regarding the path is saved in a second file (e.g., a justify budgeting file or justifyBudget file) within the storage device. The detailed information may also be generated interactively. A timing budget analyzer may display some of the timing budgeting information contained in the second saved file (e.g., the justify budgeting file) to report it to the user.

Figure 11:
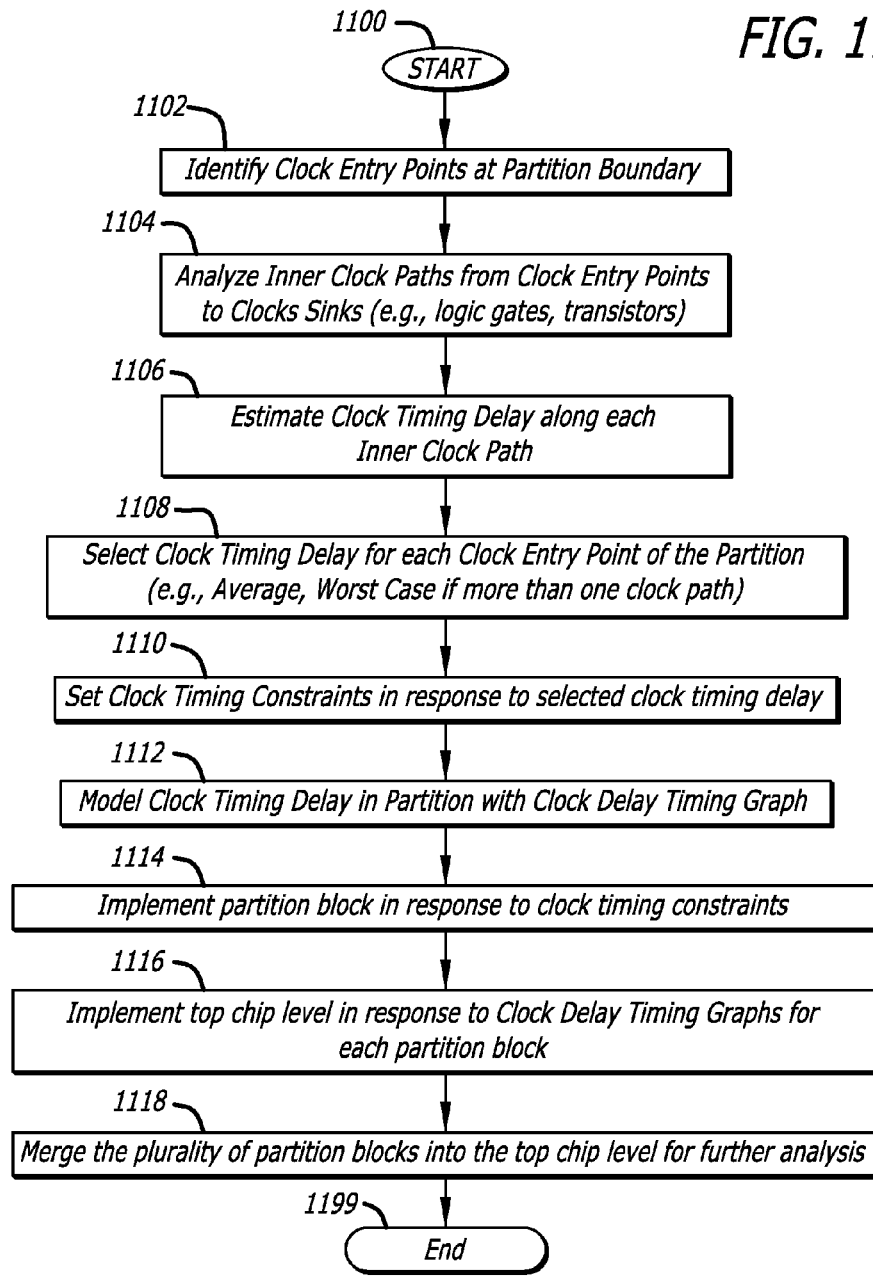
FIG. 11 illustrates a flow chart of an exemplary method of designing in parallel a top chip level and partition blocks on lower levels of a chip hierarchy.

Referring now to FIG. 11, a method of clock timing budgeting is now described with reference to FIGS. 4A-4B, 5-7 including automatic generation of block level timing constraints for the inner clock paths in each block-level circuit. The method starts at process 1100 and then goes to process 1102.

At process 1102, each partition block is analyzed to determine one or more clock entry points (CEP) at the partition boundaries for one or more clock signals used therein.

Figure 4A:
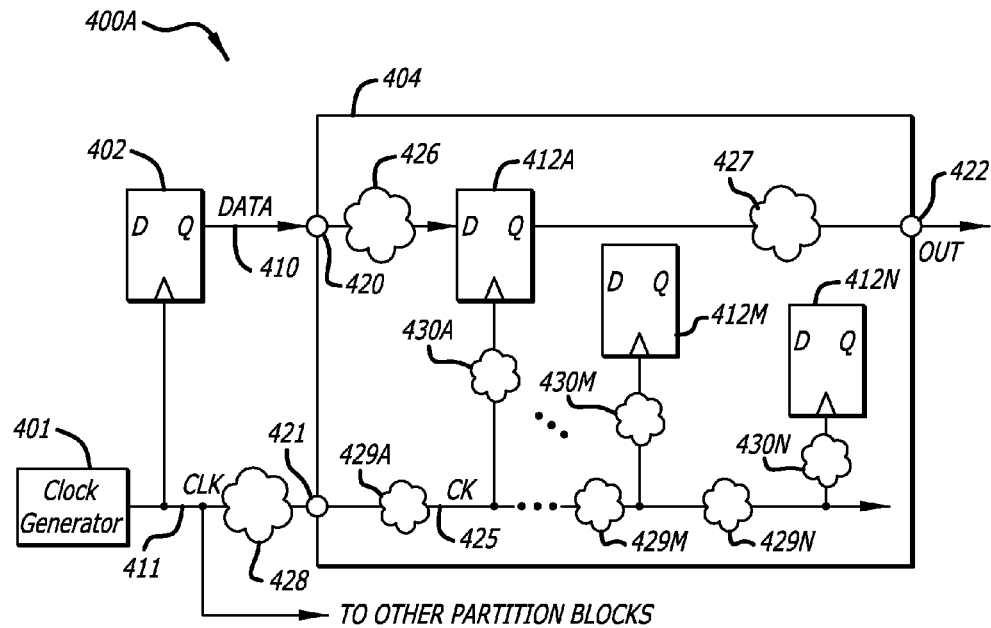
FIG. 4A illustrates an exemplary integrated circuit design partition with data and clock inputs.

Referring now to FIG. 4A, a block diagram of a circuit 400A including an exemplary partition block 404 is shown. The partition block 404 has a data entry point DEP 420, a clock entry point CEP 421, and a data out point DOP 422 at the partition boundary separating the internal circuits and paths of the partition from external circuits and paths. The entry points 420-422 may also be referred to as pins of the partition block.

A clock generator 401 generates an external clock signal CLK 411 that is coupled into the block 404 at the clock entry point 421. The clock generator 401 may be a simple clock buffer for buffering an input clock signal or a more complex circuit such as a clock oscillator circuit or a phase locked loop (PLL) clock generator to form the external clock signal CLK 411.

The clock paths between the source and the sinks are divided or split up at each clock entry point 421 of the partition block. Conceptually, the total clock delays from chip clock root or source outside the block to the sinks inside the blocks are divided or split into portions outside and inside the block. The clock timing delay portion inside the block is referred to as the intra-partition clock delay. The clock timing delay portion outside the block from the clock source is referred to as the source latency. The value of the intra-partition clock delay within a block may be selectively defined by a user or estimated from a chip-level clock tree, such as described in METHOD AND SYSTEM FOR CLOCK TREE SYNTHESIS OF AN INTEGRATED CIRCUIT filed by Li et al. issued as U.S. Pat. No. 7,467,367. The intra-partition clock delay is used to perform clock budgeting.

At process 1104, inner clock paths are analyzed from the clock entry points to the clock sinks. A clock sink is a logic gate or transistor that receives the clock signal.

Figure 4B:
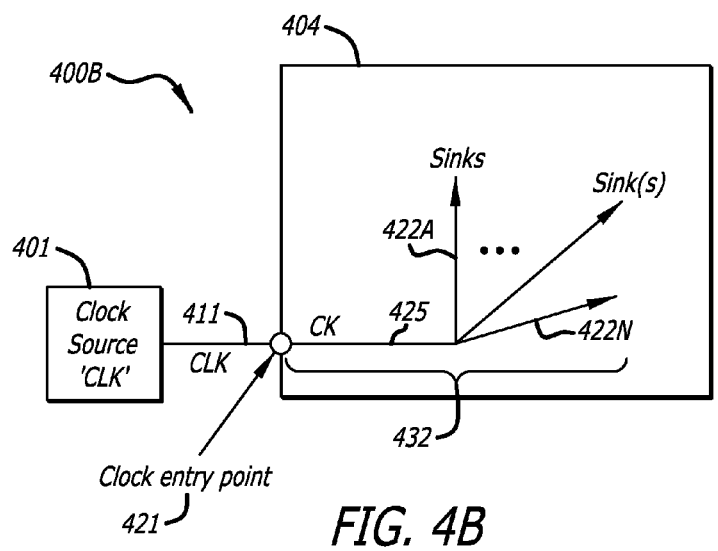
FIG. 4B illustrates an exemplary wire diagram of clock loading.

FIG. 4B illustrates a circuit 400B with clock generator 401 generating an external clock signal CLK 411 on an external clock signal path to extend into an inner clock signal path 432 within a partition block. The external clock signal CLK 411 entering into the partition block 404 at the clock entry point CEP 421, becomes the inner clock signal CK 425 on the inner clock signal path and drives the various one or more clock sinks 422A-422N (e.g., clock receiver, clock gated transistor) inside the block 404. The one or more clock sinks 422A-422N may correspond to one or more D flip flops or registers 412A-412N within the block.

Referring back now to FIG. 4A, the external clock signal CLK 411 is coupled into the partition block 404 at the clock entry point CEP 421 becoming the inner clock signal CK 425. The external clock signal CLK 411 may be coupled into other partition blocks within the integrated circuit chip. The external clock signal CLK 411 may pass through some resistor-capacitor parasitic loads and/or combinational logic 428 before being coupled into the partition block 404 at the clock entry point CEP 421. The inner clock signal CK 425 is coupled into the clock input of the D flip-flops/registers 412A-412N. However, before the inner clock signal CK 425 reaches the clock input of the D flip flops/registers 412A-412N, it may also pass through resistor-capacitor parasitic loads and/or input digital combinational logic 429A-429N and resistor-capacitor parasitic loads and/or input digital combinational logic 430A-430N.

An external D flip-flop or register 402 (a plurality of D flip-flops in parallel coupled to a bus forming a register), internal to another partition or at a different hierarchical level, generates an external data signal DATA 410. The external data signal DATA 410 is coupled into the block 404 at the data entry point DEP 420.

The external data signal DATA 410 may pass through some resistor-capacitor parasitic loads and/or input digital combinational logic 426 before being input for capture into an internal D flip flop or register 412A. The Q output signal from the internal D flip-flop or register 412A is actively generated upon receipt of an edge of the inner clock signal CK 425.

When active, the Q output signal from the internal D flip flop or register 412A may pass through some resistor-capacitor parasitic loads or output digital combinational logic 427 before being output from the block 404 as the output signal OUT at the data out point DOP 422. The partition block 404 may include other internal D flip flops or registers 412B-412N each having their own clock path and data path that may or may not have input digital combinational logic 426 and/or output digital combinational logic 427.

At process 1106, the clock timing delay along each inner clock path is estimated. A clock entry point may have one or more inner clock paths to one or more clock sinks. The clock timing delay from the clock entry point to each clock sink may be estimated as the resistor-capacitor parasitic loads and/or input digital combinational logic along each path may differ.

Figure 9:
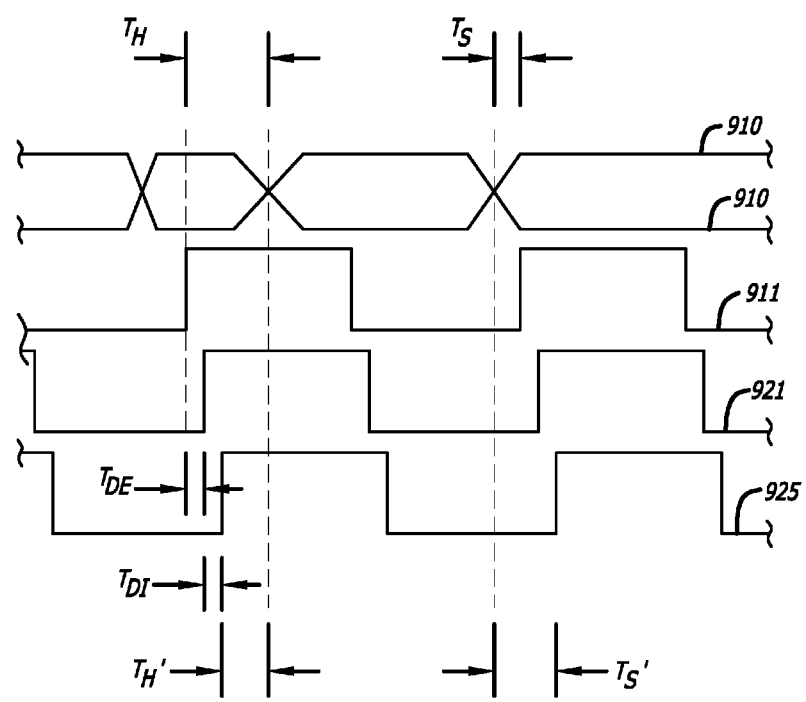
FIG. 9 is a waveform timing diagram illustrating exemplary timing in the clock path with respect to data timing.

FIG. 9 illustrates exemplary timing delays for signals around the exemplary partition block 404. A clock signal waveform 911 is exemplary of a clock signal 411 generated by the clock generator 401. Due to the timing delays from one or more of the resistor-capacitor parasitic loads and/or combinational logic 428, 429A-429N, and 430A-430N in the clock path an exemplary clock signal waveform 925 may be formed representing the internal clock signal CK 425 that is coupled into clock logic or one or more internal D flip flops/registers 412A-412N. A data signal waveform 910 represents timing of an exemplary data signal 410 that may be coupled into a partitioned block.

Without any delay in the clock path, the transistor circuits in a D flip-flop/register 412A-412N will have a setup time Ts and a hold time $T_H$ constraint for the data signal with respect to a rising or falling edge of the clock signal clocking the D flip-flop/register, such as that shown between waveforms 910 and 911 in FIG. 9.

External clock timing delay $T_{DE}$ in the clock path 411 external to the partition, due to resistor-capacitor parasitic loads and/or combinational logic 428 or otherwise, results in a delayed clock signal such as exemplified by waveform 921 at the clock entry point 421. An exemplary external clock timing delay $T_{DE}$ is shown between the difference in the timing of edges in the waveforms 911 and 921 of FIG. 9.

Internal clock timing delay $T_{DI}$ in the clock path 425 within a partition, due to resistor-capacitor parasitic loads and/or combinational logic 429A-429N and 430A-430N or otherwise, results in a delayed clock signal such as exemplified by waveform 925. An exemplary internal clock timing delay $T_{DI}$ is shown between the difference in the timing of edges in the waveforms 921 and 925 of FIG. 9.

The delayed clock signal can alter the setup and hold times at a D flip/flop or register within a partitioned block. Assuming the data signal waveform 910 does not change, a delay in the clock signal can alter the setup and hold times, such as a shorter hold time $T_H'$ and a greater setup time Ts', as illustrated by the relationship between waveforms 910 and 925 in FIG. 9. Representing the delays in the clock path during clock budgeting can assist in obtaining timing closure of an integrated circuit design sooner.

To estimate the timing delays in the clock paths, the resistor-capacitor parasitic loads and/or input digital combinational logic along each path may be estimated as a function of distance due to placement of the gates and transistors and parasitic capacitance values for the leaf cells of the circuits in a cell library. If the clock paths are routed after the clock tree is synthesized, the parasitic resistances and capacitances may be extracted from the routed clock paths to perhaps obtain a better estimate of the clock timing delay along each clock path.

At process 1108, a clock timing delay is respectively selected for each of one or more clock entry points of each partition block. As mentioned herein, each clock entry path may have multiple clock paths resulting in multiple clock timing delay values for the respective clock entry point. For simplification, a single value is selected to represent the clock timing delay for the multiple paths. If a single path, the value may be based on the single clock timing delay that is determined from the one clock path. In the case of a plurality of clock paths associated with the same clock entry point, the value may be selected based on a heuristic, such as the worst case clock timing delay, an average clock timing delay, or a weighted average clock timing delay of the plurality of clock timing delays.

At process 1110, clock timing constraints are set in response to the selected clock timing delay.

Assume that the nominal clock latency or clock timing delay for the partition block 404 is along an inner clock path CK 432 from the clock entry point CEP 421 to a clock sink S (e.g., sink 422N). The nominal clock latency or delay along this inner clock path CK 432 may also be referred to as the inter partition delay (abbreviated as inter_ptn_delay) and assigned to an inner clock signal pin CK 425 of the partition block. The inter partition delay value may vary from partition block to partition block.

At a top level, there is a given overall chip constraint for clock delay or latency. This top or chip level clock timing constraint has an overall chip target timing latency or delay that may be referred to as chip target delay (abbreviated as chip_target) and assigned to the chip clock signal pin CLK.

The original chip level timing constraint, chip_target, for the clock may be set by the following instruction:

set_clock_latency <chip_target> CLK

With the chip level clock timing constraint, clock timing constraints can be written for inner clock signal pin CK of the block 404. The following instructions are written into the block constraint file to set the clock timing constraint for the block 404:

set_clock_latency <inter_ptn_delay> CK
    set_clock_latency-source <chip_target-inter_ptn_delay> CK At process 1112, the clock timing delay in each partition is modeled by a new timing graph that considers clock latency or clock timing delays. The new timing graph may be referred to as a merged data and clock constraint (MDCC) timing graph. FIG. 6 illustrates an exemplary merged data and clock constraint timing graph 600 that models data path timing with clock timing constraints. To generate a MDCC timing graph, an initial timing graph may be formed that models data path timing alone.

FIG. 5 illustrates an initial timing graph 500 with a block model 504 that models data path timing and constraints in the partition block 404, before clock time budgeting. The block model 504 includes a timing arc 502 from the clock entry point CEP 421 to the data entry point DEP 420, and a timing arc 503 from the clock entry point CEP 421 to the data out point DOP 422. The timing graph 500 may further include a timing arc 501 to model the input delay along the external data signal DATA 410 from the data output Q of the D flip-flop or register 402 into the block 404 at the data entry point DEP 420.

The timing arc 502 has setup and/or hold timing constraints for the data signal at the data entry point DEP 420 with respect to the clock signal CLK. The timing arc 503 has an internal data signal timing delay constraint for the data path within the partition block 404. However, neither timing arc 502 nor timing arc 503 considers that there may be an inter partition delay in the clock path. The partition block model 504 may be updated to take into consideration the inter partition delay through clock time budgeting.

Referring now to FIG. 6, a MDCC timing graph 600 including a partition block model 604 for clock time budgeting is illustrated. Like the timing graph 500, the MDCC timing graph 600 may further include the timing arc 501 to model the input delay along the external data signal DATA 410 from the data output Q of the D flip-flop or register 402 into the block 404 at the data entry point DEP 420.

To take into consideration the inter partition delay through clock time budgeting, a new internal timing pin 610 (may be referred to as an internal clock time budgeting pin (clk_int) 610) is introduced within the partition block model 604. Replacing the timing arc 502 of FIG. 5 are an internal clock timing arc 602 and an internal data input timing arc 601. The internal clock timing arc 602 is formed from the clock entry point CEP 421 to the internal clock time budgeting pin 610. The internal data input timing arc 601 is formed from the data entry point DEP 420 to the internal clock time budgeting pin 610. The timing arc 503 of FIG. 5 is replaced by a data output timing arc 603 and the internal clock timing arc 602. The data output timing arc 603 is formed from the internal clock time budgeting pin 610 to the data output point DOP 422. The timing arcs may also be referred to as timing vectors. The timing arcs may be replaced with intra-partition delay characterization. That is, the timing arcs can be modeled or characterized for the budgeted/estimated timing delays for both the data paths and the clock paths into and out from the partition block.

The arrival timing arc 601 includes the arriving combinational logic delays or arriving constraint checks (e.g., setup time, hold time). The outgoing timing arc 603 includes the outgoing combinational logic delays. The internal clock timing arc 602 has an estimated partition clock latency. If parasitic resistances and capacitances are extracted from the building of clock buffer tree with a clock tree synthesis tool, a more substantial real partition clock latency may be associated with the internal clock timing arc 602 instead.

The internal clock timing arc 602 has a latency or delay (intra-partition clock latency) corresponding to the clock intrapartition delay time (intra_ptn_delay or IPD). The timing constraint of the data output timing arc 603 may be that of the timing arc 503 but adjusted for the delay (intra_ptn_delay or IPD) of the internal clock timing arc 602. The internal data input timing arc 601 has a data delay corresponding to the budged data delay, including the setup time for the data path. As shown by the arcs in FIG. 6, the intra-partition clock latency associated with the internal clock timing arc 602 has an effect on timing of the data paths involving the internal data input timing arc 601 and the data output timing arc 603.

The timing graph 600, also referred to as a timing budget model or timing budget abstraction, may be used to model timing of each partition block at the top level so that data path timing requirements are met during timing analysis at a top level, including the influence that the intra-partition clock latency may have on timing of the data path. That is, the data path timing is responsive to the clock timing budgeting and the intra-partition clock latency. The timing graph 600 may also be used for comparison to determine if the design of the partition block meets both the data and clock timing constraints.

As mentioned herein, the clock time budgeting allows for design and analysis of the top level of the chip in parallel with the design and analysis of the lower levels of the hierarchy such as the partition blocks. Accordingly, processes 1114 and 1116 while shown in series in FIG. 11 may be performed in parallel.

At process 1114, each partition block may be implemented (e.g., designed, analyzed, optimized, etc. in detail) independent from the top level and each other partition block in response to the data path and clock timing constraints.

At process 1116, the top chip level may be designed in detail independent from the lower levels of the hierarchy in response to block timing models, the clock delay timing graphs for each partition block.

At process 1118, after the top level and block levels have been implemented, they may be merged together to complete the chip design. The completed chip design may then undergo further analysis so that design goals and specifications are met.

At process 1199, the processing of the integrated circuit design may end.

IC Design Methods with Clock and Data Time Budgeting

Figure 10:
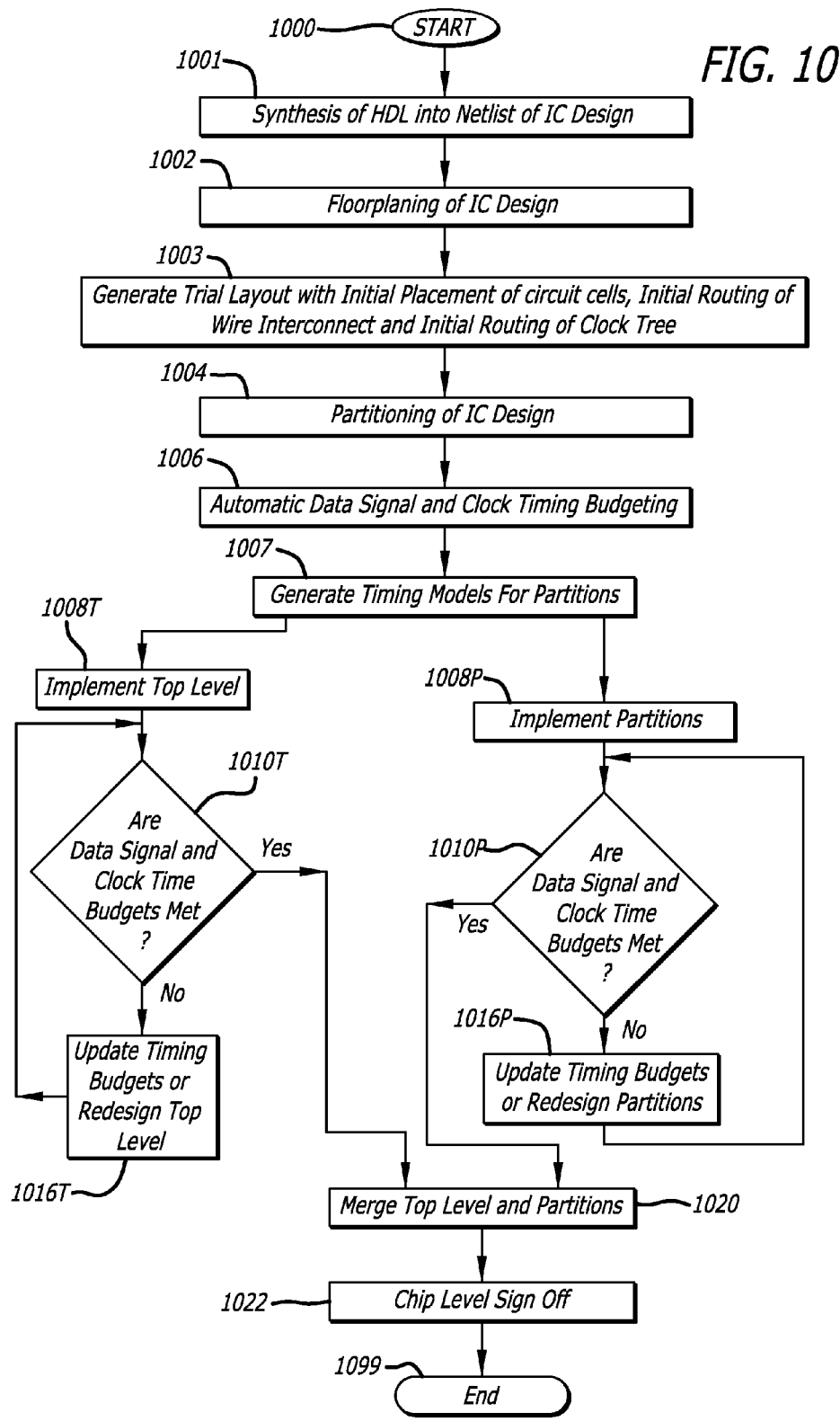
FIG. 10 illustrates a flow chart of an exemplary method of budgeting clock timing.

Referring now to FIG. 10, a flow chart illustrates an exemplary process of integrated circuit design with clock and data timing budget. The process starts at block 1000 and then goes to block 1001.

At block 1001, a high level description of the integrated circuit (IC) design is logically synthesized into a netlist of the IC design. The process then goes to block 1002.

At block 1002, a floor plan for the layout of the integrated circuit design may be planned out. Major logical blocks of the IC design or partitions may be positioned in a floor plan of the layout based on certain constraints during the floorplanning process. The process then goes to block 1003.

At block 1003, an initial placement of circuit cells, an initial routing of wire interconnect forming data paths, and an initial clock tree synthesis and routing may be performed to generate a trial layout of the integrated circuit design. This is to better gauge data signal timing delays in wire interconnect in the data paths and clock timing delays in the wire interconnect in the clock paths of the IC design. The process then goes to block 1004.

At block 1004, to ease design and analysis, the integrated circuit design is partitioned into a plurality of partitions by partitioning up the netlist. The partitioning process is responsive to the floor plan and the initial placement of the circuit cells and the routing of wire interconnects and clock tree of the trial layout. The initial chip level netlist of the integrated circuit design is partitioned into a hierarchy of a top level and a plurality of partitions (e.g., partition blocks). The top level includes an initial top level netlist and each partition includes an initial partition netlist. The process then goes to block 1006.

At block 1006, in response to the initial partition netlists and the initial top level of the integrated circuit design, data timing budgets and clock timing budgets for the plurality of partitions and the top level of the integrated circuit design may be automatically generated. The automatically generated timing budgets are saved to a file so that they can be read for later analysis and implementation of the detail design of the partition blocks and top level. The process then goes to block 1007.

At block 1007, a timing model for each of the one or more partitions of the integrated circuit may be generated in response to the one or more partition interfaces specified in the top-level netlist, the data timing budgets and the clock timing budgets. Each timing model includes an intra-partition clock timing constraint for each respective partition. The process then splits up into parallel processes that may be concurrently performed and goes to blocks 1008P and 1008T.

At block 1008P, one or more partition blocks may be implemented in response to the clock timing budgets for the clock paths and the data timing budgets for the data paths. The implementation of each block includes a block level timing analysis of the partition and an optimization the partition block netlist from an initial partition block netlist into an optimized partition block netlist. The partition netlist is optimized to meet constraints and the clock and data timing budgets. In the timing analysis, timing delays are computed for each block/circuit cell along one or more desired data signal paths for data path timing budget analysis. The timing delays contributed by each block are summed up along each selected signal paths entire length from a start point to an end point as it traverses one or more levels of hierarchy of the IC design, in response to the netlist. Timing delays are computed along the clock path for a timing budget analysis. The process may then go to block 1010P.

At block 1010P, a comparison process automatically compares the timing delay along data paths and clock paths with the data time budgets and clock time budgets, respectively. Alternatively, the comparison process 1010P may be a manual comparison process performed by a designer.

Further at block 1010P, a determination may be made by as to whether or not the data and clock timing budgets are being met along the data and clock signal paths. If a timing budget is not being met along a data signal path or a clock signal path, the path may be flagged as failing. A failing path may warrant further timing budgeting analysis to determine where a path is not meeting the data or clock timing budget. A graphical user interface (GUI) as described in U.S. patent application Ser. No. 12/437,096 entitled USER INTERFACE FOR TIMING BUDGET ANALYSIS OF INTEGRATED CIRCUIT DESIGNS filed on May 7, 2009 by inventors Vivek Bhardwaj et al., may be used to analyze a failing path. If the timing budget is not being met along a signal path, a user may elect to update a timing budget or redesign the IC in the next process, block 1016P. If the timing budgets are being met, updating/redesign process of block 1016P can be skipped and goes to process block 1020.

At block 1016P, if timing budgets are not being met (e.g., time delay is over timing budget), the timing budgets for the partitions of the IC design may be selectively updated. More likely, the netlist of the IC design may be updated so that the selected path under analysis will meet the timing budgets.

A failing clock path may be redesigned so that it meets the clock timing budgets. A partition block may be redesigned to reduce an inner clock timing delay along an inner clock path from a clock entry point at a partition boundary to a clock sink. The inner clock path may be redesigned to reduce an inner clock timing delay. Alternatively or conjunctively, an external clock path from the clock source to the clock entry point at the partition boundary may be redesigned to reduce the external clock timing delay. Logic gates clocking a clock in the clock path may be reduced to reduce the clock timing delay. Parasitic resistance and/or parasitic capacitance may be reduced in the clock path to reduce the clock timing delay. The process may then go back to block 1010P to determine if the timing budgets are being met.

At block 1008T, the top level is implemented in response to the initial top level netlist, the top level constraints (physical and timing constraints) or the clock timing budgets for the clock paths and the data timing budgets for the data paths in the top level, and each of the respective timing budgeting models for each partition instantiated into the top level. The implementation of the top level includes a top level timing analysis of the top level netlist and an optimization the top level netlist from an initial top level netlist into an optimized top level netlist.

At block 1010T, a comparison process automatically compares the timing delay along data paths and clock paths in the top level with the data time budgets and clock time budgets, respectively. Alternatively, the comparison process 1010T may be a manual comparison process performed by a designer.

Further at block 1010T, a determination may be made by as to whether or not the data and clock timing budgets are being met along the data and clock signal paths in the top level. If a timing budget is not being met along a data signal path or a clock signal path, the path may be flagged as failing. A failing path may warrant further timing budgeting analysis to determine where a path is not meeting the data or clock timing budget. A graphical user interface (GUI) as described in U.S. patent application Ser. No. 12/437,096 entitled USER INTERFACE FOR TIMING BUDGET ANALYSIS OF INTEGRATE CIRCUIT DESIGNS filed on May 7, 2009 by inventors Vivek Bhardwaj et al., may be used to analyze a failing path. If the timing budget is not being met along a signal path, a user may elect to update a timing budget or redesign the IC in the next process, process block 1016T. If the timing budgets are being met, updating/redesign process of process block 1016T can be skipped and the process goes to process block 1020.

At process block 1016T, if timing budgets are not being met (e.g., time delay is over timing budget), the timing budgets for the top level of the IC design may be selectively updated. More likely, the netlist of the IC design may be updated (optimized) so that the selected path under analysis will meet the timing budgets of the top level.

A failing clock path may be redesigned so that the partition meets the data path and clock path timing budgets. The top level may be redesigned to reduce, an external clock path from the clock source to the clock entry point at partition boundaries may be redesigned to reduce the external clock timing delay. Logic gates in the top level clocking or buffering a clock in the clock path may be reduced to reduce the clock timing delay. Parasitic resistance and/or parasitic capacitance may be reduced in the clock path to reduce the clock timing delay in the top level. The process may then go back to block 1010T to determine if the timing budgets are being met in the top level.

At process block 1020, the pluralities of partitions are merged into the top level design and to form a flattened chip level implementation. The flattened chip level may be analyzed so determine if the chip level timing constraints are being met. The process may then go to process block 1022.

At process block 1022, if the flattened chip level design or implementation meets the chip level constraints, the chip level design may be signed off. If the data path and clock path time budgeting is sufficiently accurate, the flattened chip level netlist may meet chip level timing constraints with a single optimization of the top level and each partition block to achieve a single pass design flow. That is, to achieve a single pass design flow, the data path and clock path time budgeting is sufficiently accurate so that the flattened chip level netlist meets chip level timing constraints without more than a single optimization of the top level or the partition block.

One or more of the processes may be repeated if the netlist of the IC design is updated or the budgets are updated. If constraints are met, repetition of a step may not be needed and the process may go to block 1099 and end.

Figure 18:
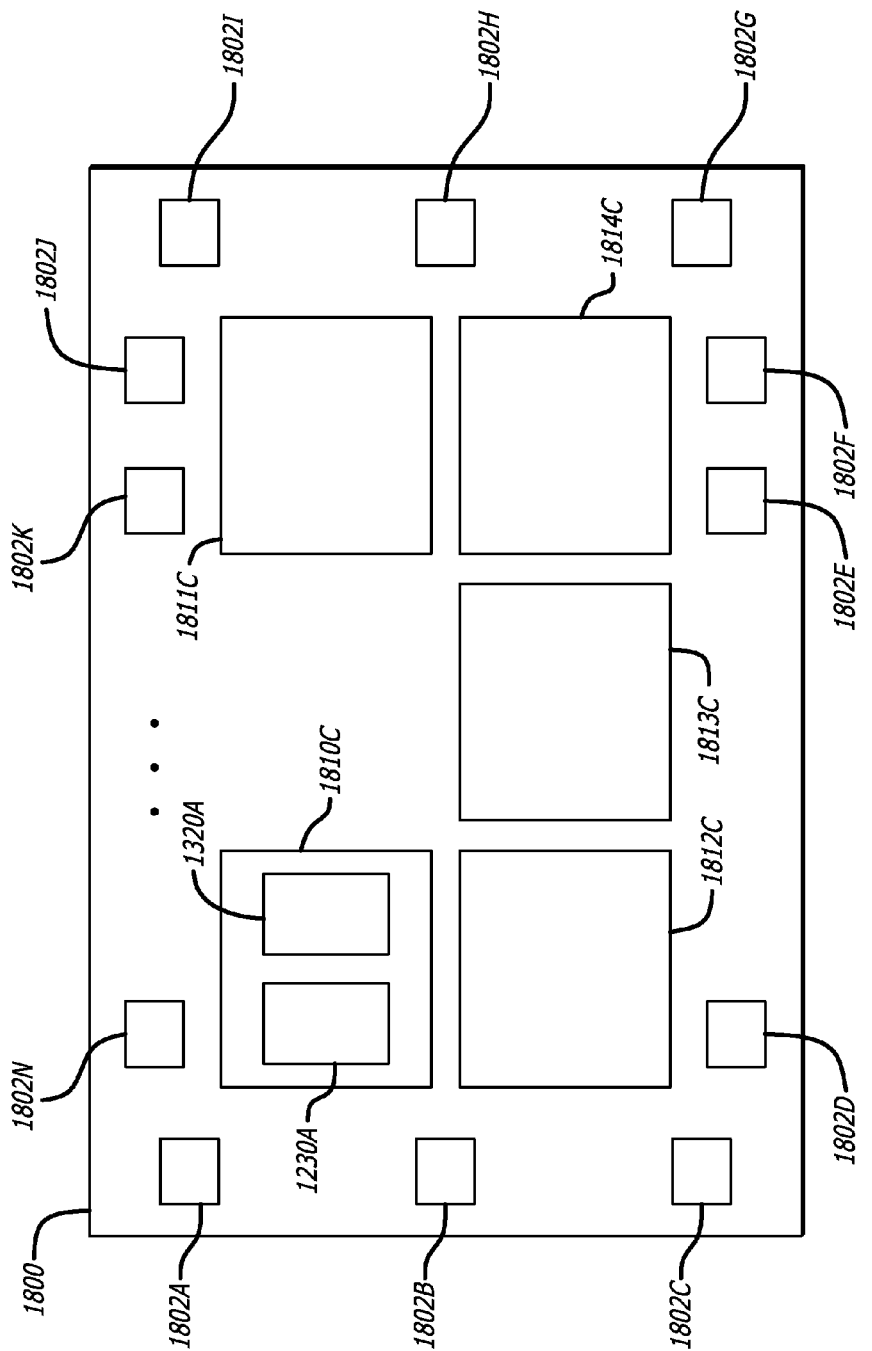
FIG. 18 illustrates a block diagram of an integrated circuit design partitioned into a plurality of partition blocks.

Referring momentarily to FIG. 18, a block diagram of an integrated circuit 1800 is shown. The integrated circuit may be partitioned into a plurality of partitions 1810C-1814C for example. Each partition may be connected to one or more of the other partitions and/or one or more pads 1802A-1802N of the integrated circuit. A partition block, such as partition block 1810C, may have an input partition portion 1230A and an output partition portion 1320A that are separately analyzed so that a multi-phase input timing model and a multi-phase output timing model are generated. A circuit model may be created for each partition 18010C-1814C with a corresponding timing model and associated partition boundary pins.

Partitions in the top level of an integrated circuit may be defined as having only boundary pins that may contain the phase attribute to be used in the time budgeting process. All circuit elements, pins and path delays, are converted to boundary pins and timing arcs in the creation of the timing model. Timing models may not contain the exceptions and therefore the exceptions are retained in the constraint file also referred to as the integrated circuit timing constraint file.

Hierarchical Common Path Pessimism Removal

Figure 12:
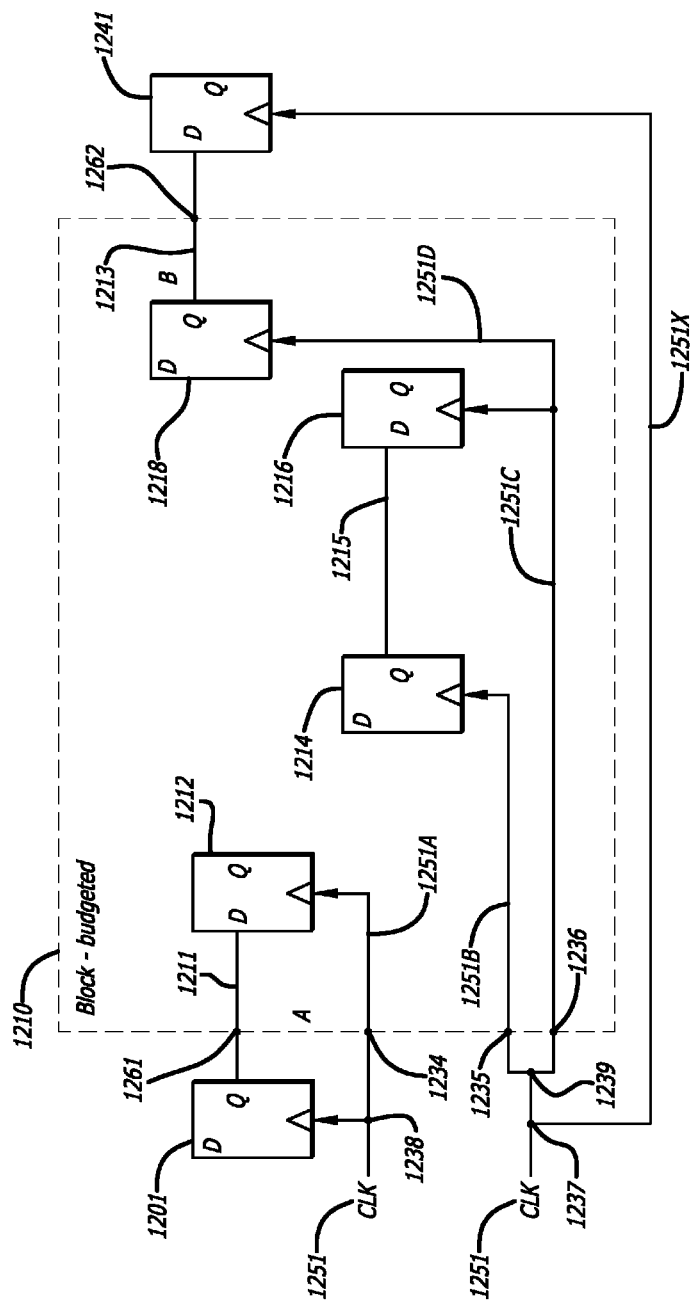
FIG. 12 illustrates an exemplary portion of an integrated circuit design that includes a partition with an external common point and input partition boundary pins through which multiple clock paths of a clock signal pass.

Referring now to FIG. 12, an exemplary portion of an integrated circuit design is illustrated that includes a partition or block 1210 with an input partition boundary including a clock signal CLK 1251 with multiple clock paths 1251A-1251D entering at clock ports 1234, 1235, and 1236. The partition or block 1210 includes D flip flops or registers 1211, 1214, 1216, and 1218 coupled together as shown. The Q output of the external D flip flops or register 1201 couples to the data input D of the flip flops or register 1212. The Q output of the internal D flip flops or register 1218 couples to the data input D of the flip flops or register 1241. The clock signal 1251 clocks external D flip flops or registers 1201,1241 as well as internal D flip flops or registers 1211, 1214, 1216, and 1218.

Note that a common node 1237 splits the same clock signal into split clock signals that propagate along the different clock paths. Prior to the common node 1237, the clock signal propagates along a common clock path that has a common impedance; a common gate delay, if any; and thus common timing. Performing a timing analysis with best case and worst case conditions, the common clock path is subjected to both fast operating conditions and slow operating conditions which can introduce pessimism into the design of circuits and data paths that may have different registers clocked by the split clock signals.

A setup check at a latch, flip-flop, or register in a circuit ensures that the latest arriving data signal at its data pin arrives before the earliest arriving clock signal on its clock pin. Often the same clock signal in a split form is used to trigger another latch, flip-flop, or register to generate the data that is arriving. The earliest arriving clock signal is typically generated by the best case conditions for the clock path while the latest arriving data signal is typically generated by the worst case conditions for the clock path. The common clock path is thus subject to different conditions under this setup check test which would not physically occur to the integrated circuit. In the physical design, however, the cells and impedance along the common clock path portion of the clock tree cannot simultaneously achieve maximum and minimum delay values. There is a single value of delay to the common point that is propagated to both the launching and capturing clock paths.

Similarly, a hold check at a latch, flip-flop, or register ensures that the earliest arriving data signal at its data pin arrives after the latest arriving clock signal at its clock pin. The arriving data signal at the data pin of a latch, flip-flop, or register is usually generated by the triggering of another latch, flip-flop, or register often with split clock signals. The earliest arriving data signal is typically generated by the best case conditions for the clock path while the latest arriving clock signal is typically generated by the worst case conditions for the clock path. The common clock path portion is thus once again subject to different conditions when the hold check test is performed which would not really occur to the physical integrated circuit. This overly pessimistic testing results in an overly pessimistic design which can be corrected by employing common path pessimism removal techniques. The amount of pessimism that is to be adjusted is the difference in the maximum timing delay in the common clock path portion under the worst case conditions and the minimum timing delay in the common clock path portion under the best case conditions.

The data paths of interest around a block can be classified as interface data paths and internal data paths. Internal data paths of a block remain internal to the block and do not extend out across the block boundaries through a data port. For example, data path 1215 in FIG. 12 is an internal data path because it remains internal within the block 1210. The data path 1215 does not extend outside the block through any data port at the boundary.

Interface data paths extend out of a partition block such as data paths 1211 and 1213 that extend out through the block 1210 of data ports 1261 and 1262 at the interface boundary of the block, respectively. Interface data paths may be either an input data path, such as data path 1211, or an output data path, such as data path 1213. With part of the data paths 1211,1212 extending outside the block and having time delays, there may be some timing information associated with each data signal at the data ports 1261,1262. The data signal at port 1261 may have a source latency associated with it that is applied to the data port 1261 to account for the delays outside the block during a block level timing analysis. The data signal at port 1262 may have a timing requirement associated with it that is applied to the data port 1261 to account for the delays outside the block during a block level timing analysis. Internal data paths need not have any source latency or timing requirement applied to it at a port because they do not extend out through any port. Thus, common path pessimism removal (CPPR) techniques at a block level may differ due to the different data paths and clocking of registers within and around a block.

Common path pessimism removal (CPPR) techniques were previously a topology dependent process. The integrated circuit was not hierarchical but flat during the timing analysis. Thus, the timing engine (also referred to as timer herein) during the flat timing analysis had the entire view of the flat circuit design and thus it was possible for the timer to infer the CPPR adjustment at the timing endpoints from the from the topology of the design. However with large hierarchical integrated circuit designs, and timing analysis being performed at the block level, the traditional CPPR timing adjustments were lost because the viewpoint of the timer was confined to the block only. If the common point of the clock paths lies outside of the block being analyzed, the timer cannot infer the CPPR value. This can affect the timing inside the block being analyzed making more difficult to meet timing requirements than it should be.

In FIG. 12, there is an external common point 1237,1238, 1239 on a clock path that is outside the block 1210 where the clock path splits into two paths. The interface data signal path 1211 is affected due to the common point 1238 on the clock signal path being outside the block 1210. The interface data signal path 1213 is affected due to the common point 1237 on the clock signal path being outside the block 1210. The internal data signal path 1215 is affected due to the common point 1239 on the clock signal path being outside the block 1210. When performing a block level timing analysis of block 1210, the ports 1261,1234,1235,1236,1262 are available but the common points 1237,1238,1239 are lost.

For CPPR, the timing engine or timer may remove the common path delays by subtracting them from the final setup slack calculation and hold slack calculations, such as by using Equations 1a and 1b as follows:

Setup Slack with CPPR Adjustment=Absolute Slack+
(Max Delay Common Clock Path−Min Delay
Common Clock Path)   Eq. 1a Hold Slack with CPPR Adjustment=Absolute Slack−
(Max Delay Common Path−Min Delay Common
Path)   Eq. 1b As shown by Equation 1a, setup slack timing with CPPR adjustment is equal to the absolute slack within a data path plus the CPPR adjustment value, where the CPPR adjustment value is the difference between the maximum timing delay in the common clock path portions and the minimum timing delay in the common clock path portions between the launch and capture clock signal paths.

The late CPPR adjustment for a data path when doing a setup check at a storage device (e.g., latch, flip-flop, register) may be referred to being a positive CPPR value because it is added to the absolute slack value such as shown in Eq. 1a. Regardless, the absolute value of the CPPR adjustment is the difference between the maximum timing delay in the common clock path portions and the minimum timing delay in the common clock path portions of the launch and capture clock signal paths. In equation form, the CPPR adjustment value is calculated as follows CPPR adjustment=(Max Delay Common Clock Path−
Min Delay Common Clock Path)   Eq. 2

As shown by Equation 1b, hold timing computed with CPPR adjustment is equal to the absolute slack within the data path less the CPPR adjustment value, where the CPPR adjustment value is the difference between the maximum timing delay in the common clock path portions and the minimum timing delay in the common clock path portions between the launch clock signal path and the capture clock signal path.

The early CPPR adjustment for a data path when doing a hold check at a storage device (e.g., latch, flip-flop, register) may be referred to being a negative CPPR value because it is subtracted from the absolute slack value such as shown in Eq. 1b. The absolute value for the CPPR adjustment is computed similarly by Equation 2 above.

In Equations 1a and 1b, the CPPR adjustment is directly applied to the slack calculation or timing delay calculation for the data path. Instead of applying the CPPR adjustment directly to the slack calculation or timing delay calculation for the data path, the same effect can be had by applying the CPPR adjustment to a timing delay (source latency) in a clock signal that is used to capture data at a register, in accordance with one embodiment of the invention. For example, the clock signal on the clock path 1251B is a launch clock with respect to output data from the register 1214 and the clock signal on the clock path 1251C is a capture clock with respect to the same data input along the data path 1215 into register 1216. Thus, if the capture clock is adjusted using the CPPR adjustment with respect to the launch clock, the CPPR adjustment is effectively applied to the slack timing in the data path 1215. In an alternate embodiment, the CPPR adjustment may be applied to the launch clock with respect to the capture clock.

There may be a timing delay, referred to as a source latency, in a clock signal that is at a port on the interface boundary of a block because it is a distance away from the clock generator or because other logic (e.g., clock gating) that is more local has added delay into the clock signal. For timing analysis of a block or partition at a given level, the source latencies of the clock signal are applied to clock ports.

Previously, the source latencies or clock timing delays that were applied to clock ports for a timing analysis of a block were absolute source latencies—no CPRR adjustment. In a hierarchical design with multiple levels, there was no proper means of moving the CPPR adjustment from the chip level down to the block level other than applying it to all the internal data paths within the block, including those data paths without any common clock path portions that did not need any CPPR adjustment. Applying a CPPR adjustment to data paths that do not need it, skews timing results of the timing analysis so that the design is overly optimistic in comparison with the timing analysis of a flat chip level. What is needed is a hierarchical CPPR method that can apply the CPPR adjustment for a block level timing analysis.

Instead of globally applying a CPPR adjustment to each and every data path within a block, a means for localizing the effect of any CPPR adjustment to the interface data signal paths and the internal data paths inside the block that need the CPPR adjustment is provided by the embodiments of the invention. As mentioned previously, if the capture clock is adjusted using the CPPR adjustment with respect to the launch clock, the CPPR adjustment may be effectively applied to the timing in a data path.

There are a number of observations that can be made upon which the solution is based. First, a clock path may diverge outside a block from a common point and enter into the block from at least two different clock ports at a boundary of the block. Thus, the same clock or its derivatives enters a block from at least these two clock ports. For example, consider the clock signal CLK 1251 shown in FIG. 12. From the common point 1237, the clock signal CLK 1251 enters the block 1210 through a first clock port P1 1235 and a second clock port P2 1236 along clock paths 1251B and 1251C, respectively. In contrast, the clock signal CLK 1251 on clock path 1251A enters into block 1210 through a single clock port 1234. The clock signal CLK 1251 on the external clock path 1251X does not enter the block 1210.

Secondly, the possible data signal path that needs the CPPR adjustment for timing can have two characteristics. Either the data signal gets launched at a flip-flop or register by a clock signal entering through the first clock port P1 and gets captured by a flip-flop or register by a clock signal entering through the second clock port P2, or vice versa—the data signal gets launched at a flip-flop or register by a clock signal entering through the second clock port P2 and gets captured by a flip-flop or register by a clock signal entering through the first clock port P1. Another way to frame this observation is that the first clock port P1 is in the launch clock path and the second clock port P2 is in the capture clock path of a given data path. Alternatively, the second clock port P2 is in the launch clock path and the first clock port P1 is in the capture clock path of a data path that has a common node and needs CPPR adjustment. Thus, there are four possible clock combinations for a data path that has a common node and needs CPPR adjustment. This gives rise to possibly four different CPPR adjustment values being selected as the CPPR adjustment value to apply to the internal data path in response to the clock combination for the data path.

Thus, for proper CPPR adjustment of a given internal data path during time budgeting, four CPPR values may need to be applied depending upon the launch and capture clock path transitions at a pair of clock ports. For example, a CPPR adjustment value is used for launch rise, capture rise, launch fall, and capture fall for a given pair of clocks and a pair of clock timing ports. Thus, it is possible for a timer or timing engine to apply proper CPPR information to internal data paths of a partition with an external common clock node by applying it to the source latency in the capture clock signal at a first port with respect to launch clock signal at the second port of a pair of clock ports.

As mentioned previously, the timing data paths may be classified as block interface data paths at the input/output of the blocks and block internal data paths. The proper CPPR adjustment for block interface data paths differs from that of block internal data paths. Generally, available time and slack time calculation methods are used with a specified end time pin for pushing the proper CPPR adjustment to the block interface data paths. Generally, multiple clocks are created and the various clock to clock relationships are defined to push the proper CPPR adjustment to the block internal data paths.

Interface Data Paths

In timing budgeting for the partition block, the CPPR adjustment to the available time for an interface data path is pin dependent. The block interface paths are corrected for CPPR adjustment by including the CPPR information in the available time at the end points of the interface data paths.

Figure 13A:
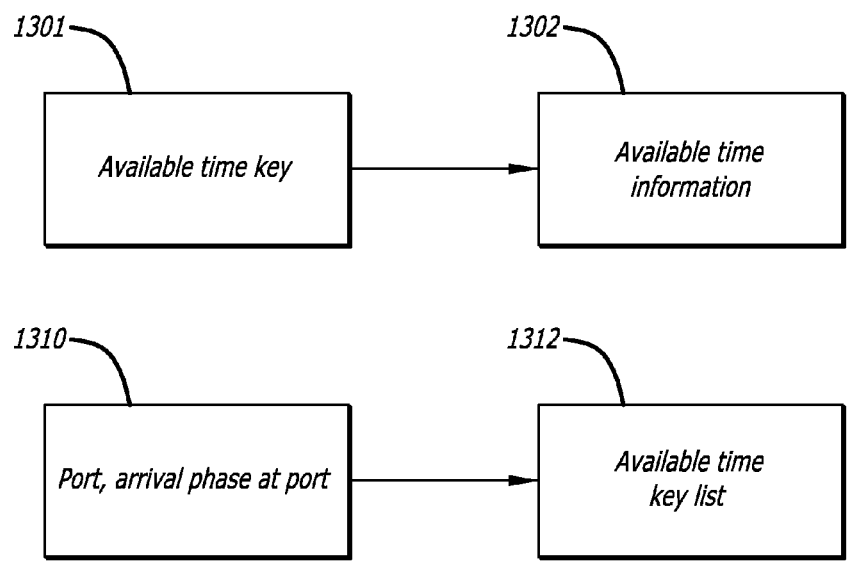
FIG. 13A illustrates an exemplary chart of hierarchical common path pessimism removal (HCPPR) factors for ports and clocks of given block.

Referring now to FIG. 13A, time budgeting stores the available time information 1301 with a signal and reference phase pair as an available time key 1301. While performing timing budgeting for the ports of a block with a ports budgeter, referred to as a critical data creation process, the port and arrival phase at a port are queried at block 1310. The port budgeter of the timing budgeter processes the relevant available time info, by matching the end required phase at the port (extracted from required phase transformation object), and the available time key 1301 from the available time key list 1312. The available time information 1302 includes end required time/arrival phase, transition (rise or fall), and the end timing pin or the signal pin that is propagated along the interface data path.

To propagate timing information back up to the chip level, an esparence object includes the end timing pin for the partition block. An esparence object is a software object that further includes information regarding the worst timing delay to a given point in a given clock domain. In other words, for a given launch clock of a signal that propagates along a path to a given point, the worst timing delay at the given point is stored in esparence object so that it can be later read out at the chip level. For example, if there are two registers in a clock domain from which the path converges at the point, then the esparence object will be the one having the worst timing delay up to that point. If the esparence object is updated and timing information for one of the paths is discarded, the relevant end point is dropped as new information is generated for the partition block.

After the partition block is simulated, the correct available time is queried by using the name of the end timing pin in addition to other information during a critical data creation process at the chip level. The name of the end timing pin ensures that the correct information is picked up for the critical data creation process for a given port and arrival phase.

In this manner, with the CPPR adjustment for the interface data paths of the blocks being made through a change to the available time (e.g., a constraint associated with the interface data path and end timing pin), the time budgeting calculations performed by the time budgeting process otherwise remain unaffected.

Internal Data Paths

Adjusting internal data paths for CPPR is more tedious than adjusting the interface data paths for CPPR. This is because time budgeting typically evaluates the interface logic of partition blocks to make decisions regarding timing budgets. Typically the internal logic within a partition block or module is ignored because it is both cumbersome and requires extra processor time and resources to consider the internal logic that the partition process and time budgeting was to reduce or eliminate.

When a clock enters from outside a partition block unbuffered by a buffer, it creates talking domains inside the block that are not available outside the block. Talking domains are two different clock domains each having registers that are associated together by a timing or data path. A clock domain of a clock is the set of registers that are clocked (captured or triggered) by the given clock. If two registers form a timing or data path inside a block or partition and are clocked by two different clocks, then the two clock domains including those registers are said to be talking domains. With talking domains in a block unavailable outside the block, retaining a CPPR adjustment is difficult.

Moreover, because the internal logic of a partition block is unavailable at the chip or top level, it is not possible to scan through the internal logic to find any and all talking domains, to be sure a complete solution to adjusting for CPPR can be made in all possible situations. Moreover, it is desirable to avoid creating new data paths to provide CPPR adjustments or affect existing internal data paths when no CPPR adjustment is needed to them.

For an internal data path registered by a clock signal, there are two cases in which a decision is made depending upon they type of clock (e.g., real or generated) and how the clock enters a partition or block (e.g., one port or multiple ports of entry).

In the first case, a real clock enters the partition through a plurality of ports. A real clock is a clock signal that is typically distributed widely through a chip from a clock generator. If there is more than one entry point of the same real clock into a partition then the entry points are paired together and the CPPR adjustment solution is applied to the pairs of entry points of this clock.

In the second case, a generated clock enters the partition. A generated clock is a clock signal that is generated by logic near the partition, such as gated clock logic for example. If a generated clock enters the partition block through a clock port, the generated clock may have its master clock or another related clock (e.g., a sibling clock, ancestor clock, or a descendent clock, that also may be referred to as a relative clock) entering through another port or perhaps through the same clock port. In this case, the generated clock and its entry point or port are paired together with the related clock and its clock entry point or port, and the CPPR adjustment solution is applied to the generated clock and its related clock.

In either case, a pair of ports and a pair of clock phases are defined to have the relevant CPPR adjustments made for internal data paths launched and captured by the same.

{{Port1, Port2}, {Phase1, Phase2}}=>CPPR Adjustment

One method applying the CPPR adjustment information at the block level is by coding extra clocks and adjusting the source clock latencies of these extra clocks with the CPPR adjustments values. In summary, the method includes: (1) For each clock port, Port1 and Port2, names of a CPPR launch clock and a CPPR capture clock are generated and paired together with respect to the data paths which each effect. (2) Next the paired Port1 launch and Port2 capture clocks are made an exclusive clock group as are the paired Port2 launch and Port1 capture clocks so that these clocks don't affect any other paths inside the design. (3) The CPPR adjustment information is coded using native timing constraints (e.g., SYNOPSIS silicon design compiler (SDC) timing constraints) to adjust the capture clock source latency of each port so that the timing for a data path is adjusted at the end point. While the launch clock has the same latencies as the original clock, the launch clock replaces the original clock for all other paths that don't need the CPPR adjustment. (4) Paths that loop from the original clock to the original clock are stopped. Similarly, paths that loop on the launch and capture clocks of the same port are stopped as well. In this manner, the native timing constraints localize the effect of CPPR adjustment values into the clock latencies themselves by using a separate set of clocks and exclusively timing them.

Hierarchical CPPR Data Base

Figure 15A:
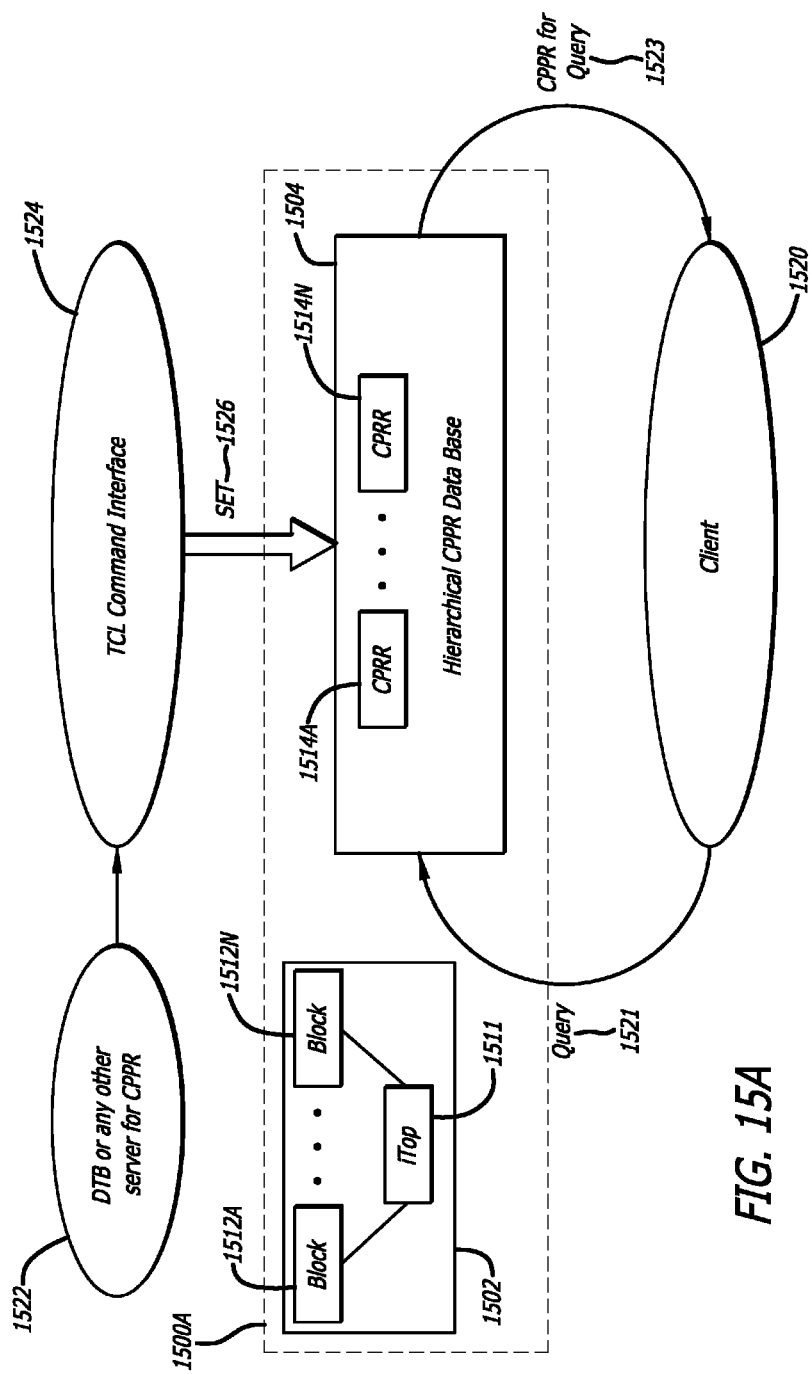
FIGS. 15A-15B illustrate block diagrams of storage systems and interfaces for a hierarchical CPPR data base.
Figure 15B:
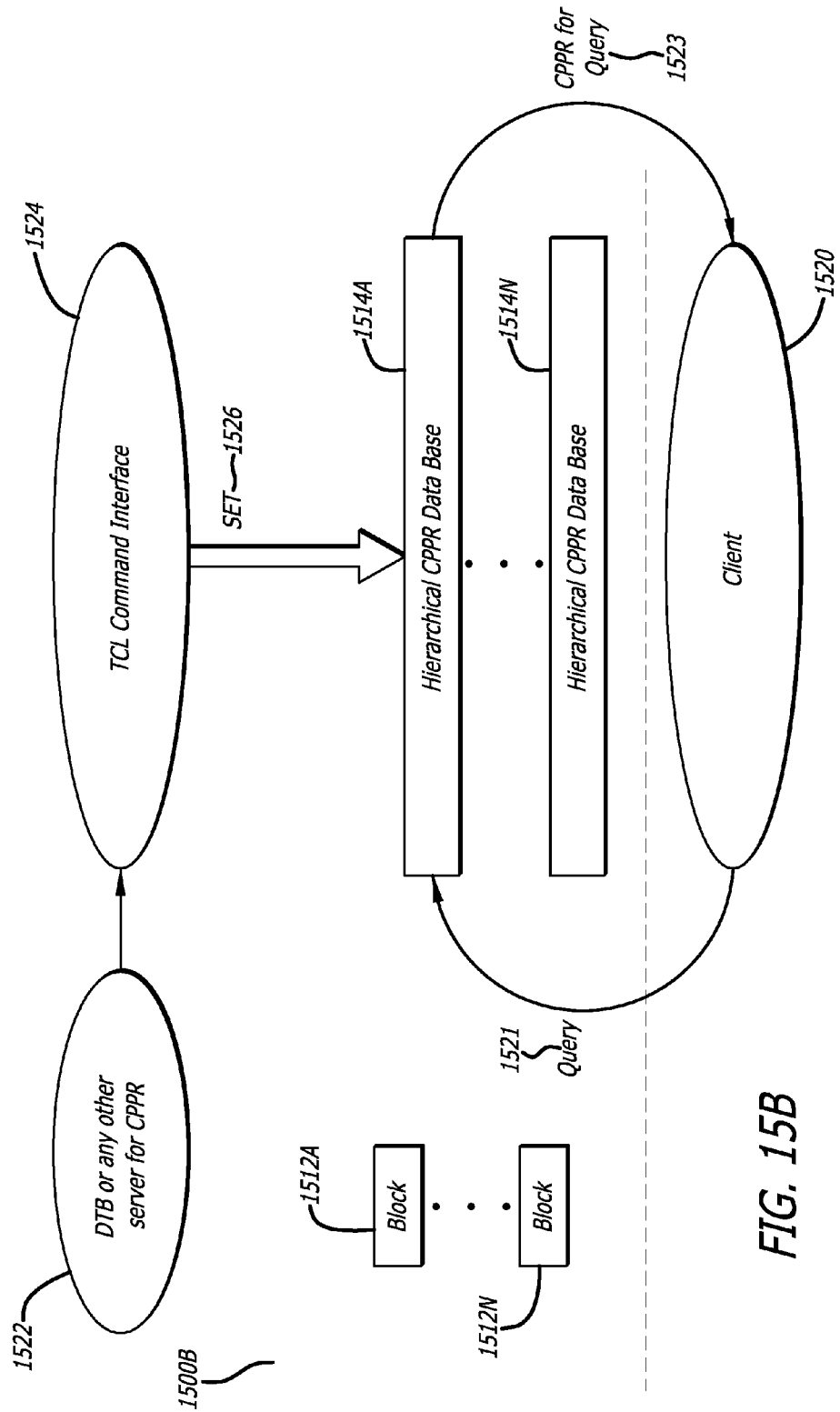

Reference is now made to FIG. 13B illustrating the data entry fields for a hierarchical CPPR data base (e.g., see data base 1504 shown in FIG. 15A and data bases 1514A-1514N shown in FIG. 15B). The CPPR adjustment information can be stored into the data base which can be accessed by a timer during the block level analysis. The table illustrated in FIG. 13B depicts the CPPR adjustment information 1352 that can be stored into the data base with a key 1351 to the data base that can be used to fetch the required information for a timer.

During static timing analysis of a block, a timer tries to get the clock common point within its view. At the block level, a clock common point outside a block, the boundary of the timer, cannot be traced. Instead the timer reaches the block boundary tracing back the launch and capture paths for a common point. A timer can query the database with the set of ports and the set of clocks for the CPPR adjustment information stored in the data base to apply the CPPR adjustment information.

The data base (e.g., see database 1504 shown in FIG. 15A and databases 1514A-1514N shown in FIG. 15B) provides servers with a method to populate the data base with the CPPR adjustment information and a method for a timer to access the CPPR adjustment information and apply it to the block level timing analysis.

As discussed herein, the CPPR adjustment may vary depending upon the whether or not the clocks entering each port are a launch clock or a capture clock and also what edge (e.g., rising or falling) of the clock that is active. For each partition block, CPPR adjustment information is stored into a database associated with a key.

In FIG. 13B, a CPPR data base entry 1350 is illustrated that is associated with a partition block. The CPPR data base entry 1350 includes a key 1351 and associated CPPR information 1352. The associated CPPR information 1352 is stored as a two by four matrix of values for each pair of ports and clocks. The eight CPPR adjustment values stored in the matrix are the different possible combinations of port1, port2, clock1, clock2 being a launch port/clock or a capture port/clock and the different possible combinations of rising or falling edges of the clock that is active such as launch rise/capture rise (LRCR), launch rise/capture fall (LRCF), launch fall/capture rise (LFCR), and launch fall/capture fall (LFCF). A plurality of CPPR data base entries 1350 are stored in a data base associated with a plurality of partition blocks. The key 1351 provides the port numbers and clock names and whether the ports/clocks are for a launch clock signal or a capture clock signal with respect to the associated CPPR adjustment information.

Referring now to FIG. 15A, an IC database 1500A is illustrated including an IC netlist 1502 and a hierarchical CPPR data base 1504. The IC netlist 1502 is a hierarchical netlist that includes a top chip level netlist 1511 and a plurality of partition block netlists 1512A-1512N. The hierarchical CPPR data base 1504 includes a plurality of CPPR data base entries 1350A-1350N associated with one or more of the partition blocks 1512A-1512N of the IC netlist 1502. Each of the CPPR data base entries 1350A-1350N is an instance of the CPPR data base entry 1350 illustrated in FIG. 13B and includes the associated CPPR information 1352 for each partition block 1512A-1512N of the IC netlist 1502.

The hierarchical CPPR data base 1504 stores the CPPR information as conceived from the chip level and applies it to the block level. An external client, such as a timer or timing engine, queries the hierarchical CPPR data base 1504 with a query 1521 and receives CPPR information 1523 in response to the query 1521. There are application programming interfaces (APIs) and commands that can be used so that an external client can interface to the hierarchical CPPR data base 1504 using the CPPR data base entries and the query model.

The data base 1504 can be initialized and updated through a TCL command level interface 1524. The user or a server of the CPPR database 1522 (e.g., deriveTimingBudget—a time budgeting server) creates a command file for a partition block that is read by a HCPPRDB module in time budgeting server and the data base is populated with the CPPR information for a given partition block. An exemplary population command with the options, name and organization open ended (i.e., skeleton form) is as follows:
set_hierarchical_cppr $value-port1 $port1-port2 $port2-clock1 $clock1-clock2 $clock2-launchrise $val-capturerise $val-launchfall $val-capturefall $val.

A client 1520, such as the static timer or static timing engine, queries the hierarchical CPPR data base 1504 through the command interface 1524. The following are exemplary command sets that may be used to query the data base 1504.
bool getCPPRAdjustment (TATimingPin*sigPort,
    TATimingPin*refPin,
    TAPhase*sigPhase,
    TAPhase*refPhase,
    TATransitionType rf,
    TAAnalysisType el,
    TATime & cpprAdjustment);
OR
bool getCPPRAdjustment (TATimingPin*sigPort,
    TATimingPin*refPin,
    TAPhase*sigPhase,
    TAPhase*refPhase,
    TATime (& cpprAdjustment) [4]);

Referring now to FIG. 15B, an IC database 1500B is illustrated with a plurality of hierarchical CPPR data bases 1514A-1514N in accordance with another embodiment of the invention. The plurality of hierarchical CPPR data bases 1514A-1514N may be used for a plurality of netlists of partition blocks 1512A-1512N, respectively, one CPPR data base for each partition block and its associated netlist.

Internal Paths

Previously during a block level analysis, the CPPR adjustment could not be applied to internal data paths because the information of the common point is lost. To get the CPPR adjustment information for the internal data paths during the block level analysis, the data base 1504 keeps the CPPR adjustment based on a number of factors including port number, clock number or name, and the characteristics of the launch and capture clocks (e.g., first or fall).

For a given DB key 1351, the various CPPR adjustment information is stored for the ports and the clocks and whether or not the path is in the launch path or the capture path. A timer adds the CPPR adjustment information to the endpoint of the path. To do so, the timer can trace back from the end points of the clocks (e.g., the reference and signal clocks) to the source points at the boundary of the block. If the source points at the boundary are the primary ports and there is no common point, it can query the database for the CPPR adjustment information.

Interface Paths

The problem with interface paths having a common clock point and applying CPPR adjustment information is solved using a unique virtual clock per port, per input phase. FIG. 14 illustrates typical constraints for an interface data path of the design illustrated in FIG. 12.

For an interface path where the input clock to the flop-flop is a virtual clock, the timer queries the data base with the virtual clock as the signal clock and the reference clock, and a port that is the source port of the reference clock. CPPR adjustments, if any, may be made to the clock delay of the virtual clock. For an input data path, an input delay constraint may be used to make the CPPR adjustment. For an output data path, an output delay constraint may be used to make the CPPR adjustment. In any case, the CPPR adjustment data base storage and query model for the interface data paths is the same as that used for the internal data paths.

Slack Timing with CPPR Adjustments

Figure 16A:
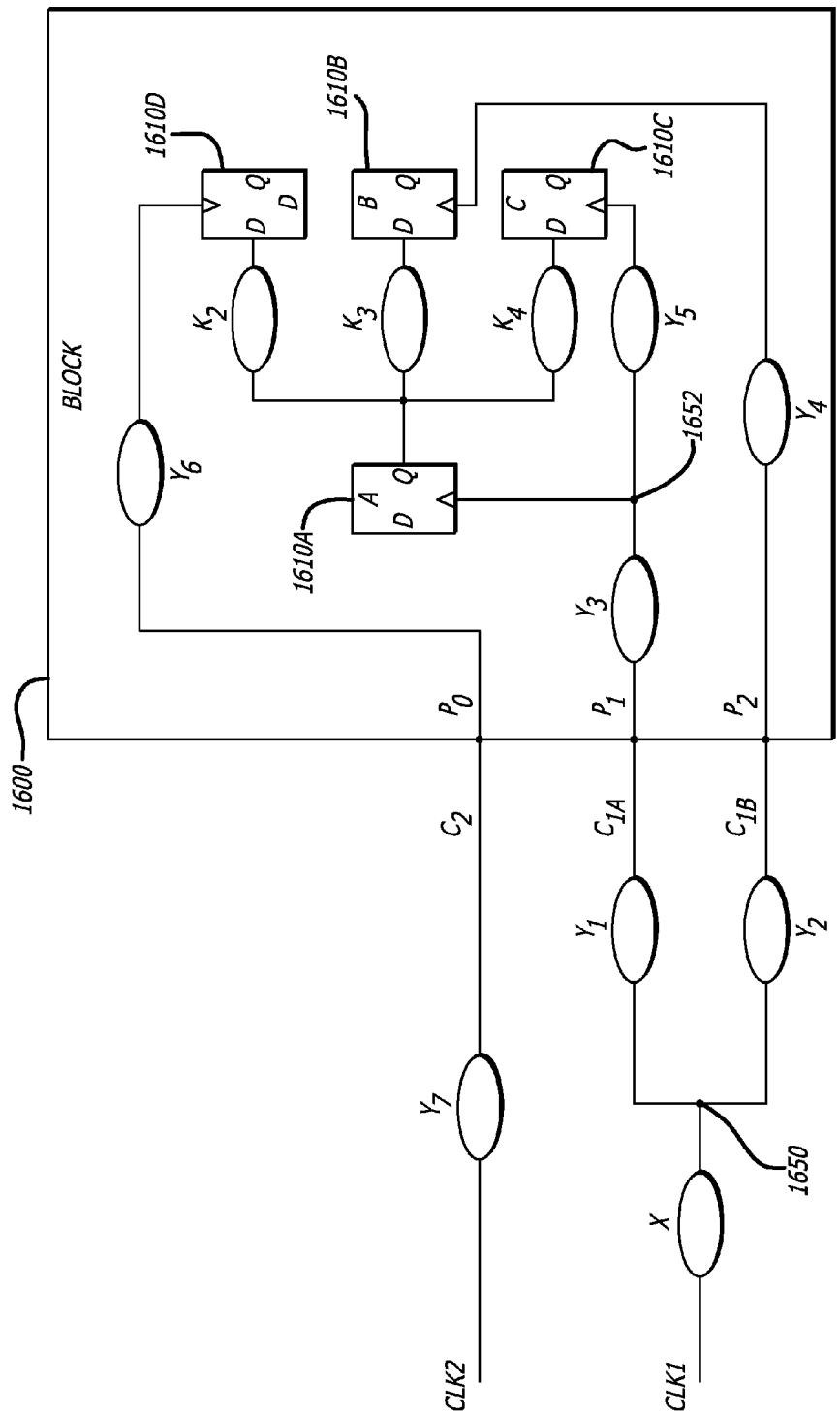
FIG. 16A illustrates an exemplary portion of an integrated circuit design that includes a partition with an input partition boundary including a clock signal with multiple clock paths and multiple clock input ports.

Referring now to FIG. 16A, an exemplary circuit design within an integrated circuit is shown with an exemplary partition block 1600. A first clock signal Clk1 and a second clock signal Clk2 are used to clock circuits, such as registers 1610A-1610D, within the partition block 1600 and perhaps elsewhere in the integrated circuit design. The first clock signal Clk1 has a common node 1650 outside the partition block setting up a common path portion and a pair of different clock path portions through which the clock signal Clk1 passes to form the clock signals C1A and C1B at the interface border of the block to respectively clock register 1610A and register 1610B. This common path has a common impedance X and/or common gate delay with a maximum timing delay of max(x) and a minimum timing delay of min(x). The common path pessimism removal adjustment value is the difference in the maximum timing delay and the minimum timing delay along the common clock path.

The first clock signal Clk1 has another common node 1652 inside the partition block 1600 setting up a larger common path portion and a pair of different clock path portions through which the clock signal Clk1 passes to clock registers 1610A and 1610C. This common path has a common impedance (and/or common gate delay) X, Y1, Y3 with a maximum timing delay of [max(x)+max(y1)+max(y3)] and a minimum timing delay of [min(x)+min(y1)+min(y3)]. The common path pessimism removal adjustment value is the difference in maximum timing delay and the minimum timing delay along the common clock path portion.

The partition block 1600 has three clock ports P0, P1, and P2 through which clock signals C2, C1A, and C1B respectively enter it. The clock paths through the clock ports having various impedances (and/or gate delays) X and Y1 through Y7 that provide timing delay x and y1 through y7 in the clock signals along the clock paths. The internal data path from the Q output of the register A 1610A to the D inputs of the register B 1610B through register D 1610D have various impedances (and/or gate delays) K2 through K4 that provide timing delay k2 through k4 in the data signal propagating along the internal data path.

The first internal data path (also referred to as block timing path) of interest is one from the Q output of register A 1610A to the D input of the register B 1610B. The second internal data path of interest is one from the Q output of register A 1610A to the D input of register C 1610C. The third internal data path of interest is one from the Q output of register A 1610A to the D input of the register D 1610D.

For the exemplary block 1600, assume that the clock period (CP) is ten (10) nanoseconds (ns); the minimum delay in the clock path due to impedances (and/or gate delays) X and Y1 through Y7, min(x) and min(y1) through min(y7) respectively, is two (2) ns; and the maximum delay in the clock path due to impedances (and/or gate delays) X and Y1 through Y7, max(x) and max(y1) through max(y7) respectively, is four (4) ns. Thus, without CPPR adjustment, the clk1 source latency for clock signals C1A and C1B respectively at the ports P1 and P2 are as follows:

Port P1: Early latency [min(x)+min(y1)]=4 ns
   Late latency [max(x)+max(y1)]=8 ns
Port P2: Early latency [min(x)+min(y2)]=4 ns
   Late latency [max(x)+max(y2)]=8 ns Without CPPR adjustment, the setup slack timing of the first internal data path can be determined from the following equation:

$$slack_{A \to B} = \{min(x)+min(y2)+min(y4)+CP\} - \{max(x)+max(y1)+max(y3)+max(k3)\} \; slack_{A \to B} = \{4+2+10\} - \{8+4+4\} = 0 \text{ ns}$$

The sum of [min(x)+min(y2)] is the early clk1 source latency at port P2 for the capture clock which is 4 ns. The sum of [max(x)+max(y1)] is the late clk1 source latency at port P1 for the launch clock which is 8 ns.

Without CPPR adjustment, the setup slack timing of the second internal data path can be determined from the following equation:

$$slack_{A \to C} = \{min(x)+min(y1)+min(y3)+min(y5)+CP\} - \{max(x)+max(y1)+max(y3)+max(k4)\} \; slack_{A \to C} = \{4+2+2+10\} - \{8+4+4\} = 2 \text{ ns}$$

The sum of [min(x)+min(y1)] is the early clk1 source latency at port P1 for the capture clock which is 4 ns. The sum of [max(x)+max(y1)] is the late clk1 source latency at port P1 for the launch clock which is 8 ns.

Without CPPR adjustment, the setup slack timing of the third internal data path can be determined from the following equation:

$$slack_{A \to D} = \{min(y7)+min(y6)+CP\} - \{max(x)+max(y1)+max(y3)+max(k2)\} \; slack_{A \to D} = \{2+2+10\} - \{8+4+4\} = -2 \text{ ns}$$

The sum of [max(x)+max(y1)] is the late clk1 source latency at port P1 for the launch clock which is 8 ns.

Now we consider the setup slack timing with CPPR adjustments. For each port with a common clock path portion, there are a pair of clock names generated, one for a launch clock and another for a capture clock.

The first internal data path has the impedance or gate delay X in the common clock path portion. For the first internal data path, setup slack timing with CPPR adjustments can be determined from the following equation:

$$slack_{A \to B}(CPRR) = \{min(x)+min(y2)+min(y4)+CP\} - \{max(x)+max(y1)+max(y3)+max(k3)\} + CPPRadj$$

where CPPRadj is the common path pessimism removal adjustment determined by equation 2 above and is as follows in this case:

$$CPPRadj = max(x) - min(x)$$

Substituting the CPPRadj into the setup slack equation we find that:

$$slack_{A \to B}(CPRR) = \{min(x)+min(y2)+min(y4)+CP\} - \{max(x)+max(y1)+max(y3)+max(k3)\} + \{max(x)-min(x)\} \; slack_{A \to B} = \{4+2+10\} - \{8+4+4\} + \{4-2\} = 2 \text{ ns}$$

where the launch clock is the launch clock at port P1 and the capture clock is the capture clock at port P2.

The second internal data path is clocked with a clock path that has a larger common clock path portion. Setup slack timing with CPPR adjustment for the second internal data path can be determined from the following equation $$\text{slack}_{A \to C}(CPRR) = \{\min(x) + \min(y1) + \min(y3) + \min(y5) + CP\} - \{\max(x) + \max(y1) + \max(y3) + \max(k4)\} + CPPR\text{adj}$$

where
CPPRadj={max(x)+max(y1)+max(y3)}−{min(x)+min(y1)+min(y3)}
CPPRadj=(4+4+4)−(2+2+2)=6
Thus, setup slack timing with CPPR adjustment for the second internal data path is computed $$\text{slack}_{A \to C}(CPRR) = \{2+2+2+10\} - \{4+4+4+4\} + 6 = 8 \text{ ns}$$

where the launch clock is the launch clock at port P1 and the capture clock is the capture clock at port P1.

Setup slack timing with CPPR adjustment for the third internal data path can be determined from the following equation $$\text{slack}_{A \to D} = \{\min(y7) + \min(y6) + CP\} - \{\max(x) + \max(y1) + \max(y3) + \max(k2)\} + CPPR\text{adj slack}_{A \to D}$$
$$(CPRR) = \{2+2+10\} - \{8+4+4\} + 0 = -2 \text{ ns}$$

where the launch clock is the launch clock at port P1 and the capture clock is the capture clock at port P0. Because different root clocks are used to launch data at register 1610A and capture data at register 1610D, there is no common clock path portion and thus no CPPR adjustment (CPPR adjustment value of zero) to the slack timing. The setup slack timing remains the same as does the hold slack timing due to the lack of a common clock path portion and no CPPR adjustment.

Recall that the late CPPR adjustment is a positive CPPR adjustment value for a data path when doing a setup check and the early CPPR adjustment is a negative CPPR adjustment value for the data path when doing a hold check, while the absolute value is the same. Determined at the chip level and not the block level, the absolute value of the CPRR adjustment values for setup and hold checks for the internal data paths of the circuit shown in the block illustrated in FIG. 16A are as follows:

| Data Path | CPPR Adjustment Value (Absolute Value) |
|---|---|
| From Register 1610A to Register 1610B | 2 ns |
| From Register 1610A to Register 1610C | 6 ns |
| From Register 1610A to Register 1610D | 0 ns |

Figure 16B:
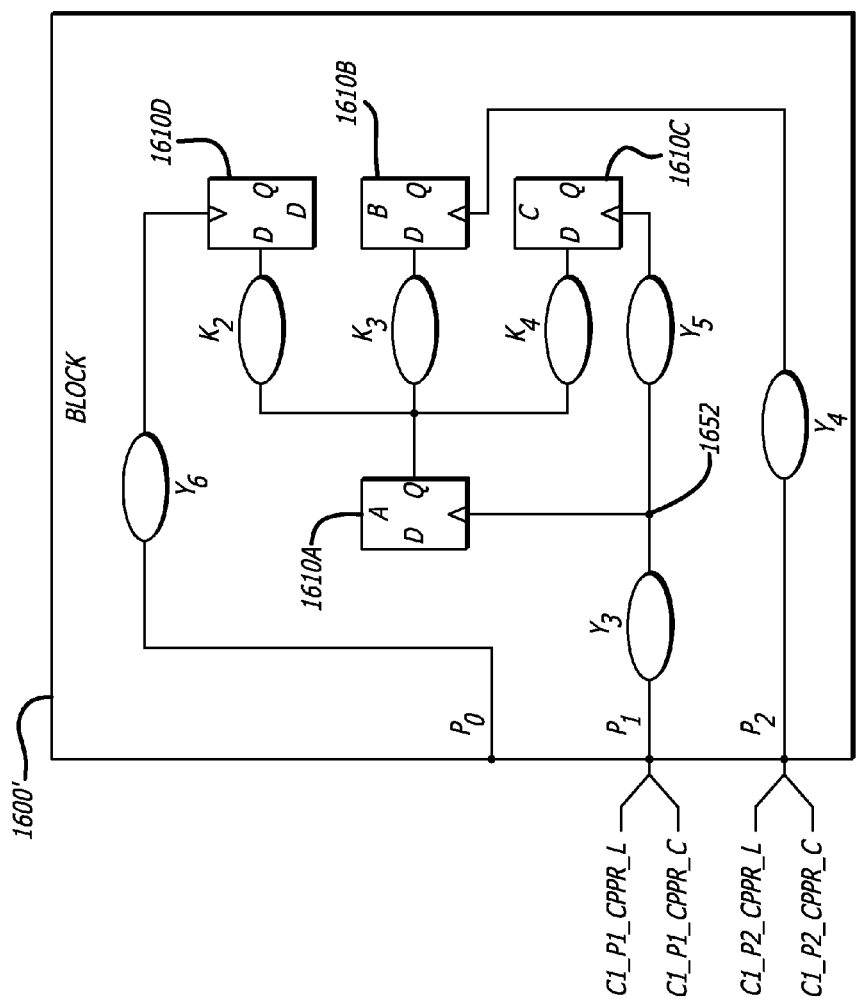
FIG. 16B illustrates the exemplary partition shown in FIG. 16A at a block level with modified clock input ports for the multiple clock paths.

FIG. 16A is a view of the block 1600 at a hierarchical level higher than a block level (e.g., chip level or top level) because it includes circuits external to the block. FIG. 16B illustrates a block diagram of a block 1600' from a low level view or a block view. The block 1600' is block 1600 but with modified clock ports P1 and P2 having both a launch clock and a capture clock. For port P1, the launch clock is defined to be C1_P1_CPPR_L and the capture clock is defined to be C1_P1_CPPR_C. For port P2, the launch clock is defined to be C1_P2_CPPR_L and the capture clock is defined to be C1_P2_CPPR_C.

At the block level, the common clock path outside the block is what is important and not any common clock paths inside the partition or block. Accordingly, the common clock path before the common point 1650 is relevant and its CPPR adjustment value is to be applied to the capture clocks at the clock ports P1 and P2. Common clock paths within the partition block, such as that formed by common point 1652, are clocked by a clock signal at the same clock port and can be accounted for during the block level analysis. Accordingly, the CPRR adjustment value of 2 ns from the common clock path outside the block is applied to the early source latency (positive CPPR) and late source latency (negative CPPR) of the capture clock for each clock port P1 and P2. Thus with reference to FIG. 16B, the launch clock source latencies and the adjusted capture clock source latencies at the ports P1 and P2 are as follows:

| Clock: | Early Source Latency (+CPPR) | Late Source Latency (−CPPR) |
|---|---|---|
| P1 launch clock: C1_P1_CPPR_L | 4 ns | 8 ns |
| P1 capture clock: C1_P1_CPPR_C | 6 ns | 6 ns |
| P2 launch clock: C1_P2_CPPR_L | 4 ns | 8 ns |
| P2 capture clock: C1_P2_CPPR_C | 6 ns | 6 ns |

As computed previously, at port P1, the clk1 early latency was 4 ns and the clk1 late latency was 8 ns. These values are the port P1 launch clock early and late source latencies respectively. The port P1 capture clock has the same early and late source latencies but adjusted with the respective CPPR adjustment value.

Similarly at port P2, the clk1 early latency was computed to be 4 ns and the clk1 late latency was computed to be 8 ns. These values are the port P2 launch clock early and late source latencies respectively. The port P2 capture clock has the same early and late source latencies but adjusted with the respective CPPR adjustment value.

Note that in the foregoing example, the CPRR adjustment is being made to the capture clocks (C1_P1_CPPR_C and C1_P2_CPPR_C), such that there is no CPRR adjustment made on either of the P1 and P2 launch clocks (C1_P1_CPPR_L and C_P2_CPPR_L). In an alternate embodiment, the CPRR adjustment may be applied to the launch clocks and not the capture clocks.

Constraint Based CPPR Adjustments

Previously, slack timing with CPRR adjustment could not be determined on the block with the prior set of constraints. The following is an example of the original block based clock constraints for the clocks generated by time budgeting process for a block.
create_clock-name {clkv}-period 10.0000-waveform {0.0000 5.0000}
create_clock-name {clk1}-period 10.0000-waveform {0.0000 5.0000} [list\
 [get_ports {clk2}]\
 [get_ports {clk1}]]
What follows are exemplary constraints that may be generated for an exemplary test case with CPRR adjustment, such as block 1600. The ports P1 and P2 may have a clock latency specified with a dash clock (-clock) option.
Start of the handcrafted CPPR based constraints for the clocks
Initially, all the clock to clock relationships that existed previously are switched off by the following constraint.
Switch off all the clock to clock relationships that existed previously.
set_false_path-from [get_clocks {clk1}]-to [get_clocks {clk1}]
The "-from" clocks, (e.g., clk1), are the launch clocks. The "-to" clocks, (e.g., clk1), are the capture clocks.
Semi-modified original clock latency constraints.

Originally the clock latency constraints are applied on each port. These are modified as follows to make the constraints clock name based instead of port named based as follows:

set_clock_latency-source-early-rise 30.0035 [get_ports {clk1}]-clock [get_clocks {clk1}]
set_clock_latency-source-early-fall 30.0035 [get_ports {clk1}]-clock [get_clocks {clk1}]
set_clock_latency-source-late-rise 36.0043 [get_ports {clk1}]-clock [get_clocks {clk1}]
set_clock_latency-source-late-fall 36.0043 [get_ports {clk1}]-clock [get_clocks {clk1}]
set_clock_latency-source-early-rise 30.0043 [get_ports {clk2}]-clock [get_clocks {clk1}]
set_clock_latency-source-early-fall 30.0043 [get_ports {clk2}]-clock [get_clocks {clk1}]
set_clock_latency-source-late-rise 36.0053 [get_ports {clk2}]-clock [get_clocks {clk1}]
set_clock_latency-source-late-fall 36.0053 [get_ports {clk2}]-clock [get_clocks {clk1}]

Typically, the early source latency is with best case conditions while the late source latency is with worst case conditions.

Cppr Clock Name Generation:

For each clock port of a partition, two clocks with unique names are generated. One clock is named as the launch clock (e.g., xxxx_CPPR_TB_L) and the other clock is named as the capture clock (e.g., xxxx_CPPR_TB_C).

As illustrated in FIG. 16B, the following clock signal names are generated for Port P1:

P1 launch clock: C1_P1_CPPR_L
P1 capture clock: C1_P1_CPPR_C

As illustrated in FIG. 16B, the following clock signal names are generated for Port P2:

P2 launch clock: C1_P2_CPPR_L
P2 capture clock: C1_P2_CPPR_C

Launch clock is an auxiliary clock which is used to time all the already existing paths which are in the fan out cone of the given port. As all the clock to clock relationships are set to false, without the launch clock being defined, the path between the same clock may be lost.

Capture clock is the true CPPR clock which includes the CPPR adjustments, in the form of the source clock latencies.

Nomenclature: $clkName_$portName_CPPR_TB_L/C (launch or Capture)

The following are exemplary commands to generate the launch and capture clock names for each clock port:

create_clock-name {clk1_clk1_CPPR_TB_L}-period 10 [get_ports {clk1}]-add
create_clock-name {clk1_clk1_CPPR_TB_C}-period 10 [get_ports {clk1}]-add
create_clock-name {clk1_clk2_CPPR_TB_L}-period 10 [get_ports {clk2}]-add
create_clock-name {clk1_clk2_CPPR_TB_C}-period 10 [get_ports {clk2}]-add Clock to Clock Constraints Data paths having an original launch clock of clk1 and an original capture clock of clk1 are set to false so that no timing is generated within a partition block using the original clocks. This is accomplished by setting all paths to false between the launch and capture clocks on the same port. This assures that no new paths are created.

Turn off paths between launch and capture clocks on same port, so that no new paths are created using the following exemplary constraints:

set_clock_group-name G1-logically_exclusive-group {clk1_clk1_CPPR_TB_L}-group {clk1_clk1_CPPR_TB_C} set_clock_group-name G2-logically_exclusive-group {clk1_clk2_CPPR_TB_L}-group {clk1_clk2_CPPR_TB_C}

Another step in the process is to generate exclusive groups of launch clocks ("xxx_L") and capture clocks ("xxx_C") on each pair of common clock ports (P1 and P2).

Make an exclusive group of the launch clock and the capture clock using the following constraints:

set_clock_group-name G3-logically_exclusive-group {clk1_clk2_CPPR_TB_L clk1_clk1_CPPR_TB_C}
set_clock_group-name G4-logically_exclusive-group {clk1_clk1_CPPR_TB_L clk1_clk2_CPPR_TB_C}

Another step in the process for adding clock to clock constraints for the CPRR adjustment is to stop data paths that are between capture clocks on the same port.

Make sure that the capture clocks are timed with the other launch clocks only. Turn off paths between capture clocks on the same port. Capture clock remains the capture clock:

set_false_path-from [list [get_clocks {clk1_clk1_CPPR_TB_C}] [get_clocks {clk1_clk2_CPPR_TB_C}]]

Note that in this embodiment the CPRR adjustment is being made to the capture clocks, such that there is no CPRR adjustment made on either of the P1 and P2 launch clocks (C1_P1_CPPR_L and C1_P2_CPPR_L). In an alternate embodiment, the CPRR adjustment can be applied to the launch clocks and not the capture clocks.

Latencies on the launch clocks and original clocks remain the same. The launch clock will take care of all the paths which have the same launch clock and capture clock on chip. The following commands set the clock source latency for launch clocks on the ports:

set_clock_latency-source-early-rise 30.0047 [get_clocks {clk1_clk1_CPPR_TB_L}]
set_clock_latency-source-early-fall 30.0047 [get_clocks {clk1_clk1_CPPR_TB_L}]
set_clock_latency-source-late-rise 36.0058 [get_clocks {clk1_clk1_CPPR_TB_L}]
set_clock_latency-source-late-fall 36.0058 [get_clocks {clk1_clk1_CPPR_TB_L}]
set_clock_latency-source-early-rise 30.0050 [get_clocks {clk1_clk2_CPPR_TB_L}]
set_clock_latency-source-early-fall 30.0050 [get_clocks {clk1_clk2_CPPR_TB_L}]
set_clock_latency-source-late-rise 36.0061 [get_clocks {clk1_clk2_CPPR_TB_L}]
set_clock_latency-source-late-fall 36.0061 [get_clocks {clk1_clk2_CPPR_TB_L}]

The adjustment in time for common path pessimism removal is set against the capture clocks. That is, the latencies in the capture clocks are adjusted for CPRR. In the case of early latency for a setup check, the capture clock is adjusted with a positive CPRR value. In the case of late latency for a hold check, the capture clock is adjusted with a negative CPRR value.

Adjusted latencies for the capture clocks is –CPPR for late CPPR adjustment and +CPPR for early CPPR adjustment. Assume in the exemplary constraints above that the timing rise and fall times above for the launch clocks are the same for the capture clocks. Further assume that the given derating or CPPR adjustment is a negative 4.0008 or a positive 4.0008, respectively. Capture clocks are the real CPPR clocks that are adjusted in time at one port and paired with the launch clocks of the other port. The constraints for the latency in the capture clocks with the CPPR adjustment are then as follows:

| | | |
|---|---|---|
| set_clock_latency-source-early-rise {clk1_clk1_CPPR_TB_C}] | 34.0055 | [get_clocks |
| set_clock_latency-source-early-fall {clk1_clk1_CPPR_TB_C}] | 34.0055 | [get_clocks |
| set_clock_latency-source-late-rise {clk1_clk1_CPPR_TB_C}] | 32.0050 | [get_clocks |
| set_clock_latency-source-late-fall {clk1_clk1_CPPR_TB_C}] | 32.0050 | [get_clocks |
| set_clock_latency-source-early-rise {clk1_clk2_CPPR_TB_C}] | 34.0058 | [get_clocks |
| set_clock_latency-source-early-fall {clk1_clk2_CPPR_TB_C}] | 34.0058 | [get_clocks |
| set_clock_latency-source-late-rise {clk1_clk2_CPPR_TB_C}] | 32.0053 | [get_clocks |
| set_clock_latency-source-late-fall {clk1_clk2_CPPR_TB_C}] | 32.0053 | [get_clocks |

End of CPPR Based Constraints ##

It is in this manner of setting constraints for the capture clock that the CPRR adjustment in timing along internal data paths is made for each partition block.

Computer System for Use with Time Budgeting Software

Referring now to FIG. 17, a computing system 1700 is illustrated that may be used to perform some or all of the processes in accordance with a number of embodiments of the invention. In one embodiment of the invention, the computing system 1700 includes a processor 1710, a memory 1720, a removable media drive 1730, and a hard disk drive 1740.

The hierarchical CPPR data base may be stored on the hard disk drive 1740 or other storage device in communication with the processor. Instructions executed by the processor 1710 may form and maintain the hierarchical CPPR database, provide the application programming interfaces (APIs), and provide the timer to interface with the database.

In one embodiment, the processor 1710 executes instructions residing on a machine-readable medium, such as the hard disk drive 1740, a removable medium 1701 (e.g., an optical medium (compact disk (CD), digital video disk (DVD), etc.), a magnetic medium (magnetic disk, a magnetic tape, etc.), or a combination of both. The instructions may be loaded from the machine-readable medium into the memory 1720, which may include Random Access Memory (RAM), dynamic RAM (DRAM), or other type of storage device or mechanism. The processor 1710 may retrieve the instructions from the memory 1720 and execute the instructions to perform the operations described herein.

Note that any or all of the components and the associated hardware illustrated in FIG. 17 may be used in various embodiments of the system 1700. However, it should be appreciated that other configurations of the system 1700 may include more or less devices than those shown in FIG. 17.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result.

The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

When implemented as an apparatus for performing the operations described herein, the apparatus may be specially constructed for the required purposes, or it may comprise a general-purpose computer selectively activated or reconfigured by a computer program stored in the computer. Such a computer program may be stored in a computer readable storage medium, any type of storage media or device suitable for storing electronic instructions, and each coupled to a computer system bus.

The processes presented herein are not inherently related to any particular computer or other apparatus. Various general-purpose systems may be used with programs in accordance with the teachings herein, or it may prove convenient to construct a more specialized apparatus to perform the operations described.

When implemented in software, the elements of the embodiments of the invention are essentially the program, code segments, or instructions to perform the tasks. The program, code segments, or instructions can be stored in a processor readable medium or storage device that can be read and executed by a processor or other type of computing machine. The processor readable medium may include any storage medium or storage device that can store information in a form readable by a processor or other type of computing machine. The program or code segments may be downloaded via computer networks such as the Internet, Intranet, etc. and stored in the processor readable medium or storage device.

When implemented as a system, such as an electronic computer aided design (ECAD) system, the elements of the embodiments of the invention include one or more processors to execute the program, code segments, or instructions that may be stored in a processor readable medium or storage device to perform the tasks or functions of a method or process. The one or more processors may be specifically adapted to electronic computer aided design including processing logic that may comprise hardware (e.g., circuitry, dedicated logic, etc.), software, or a combination of both.

CONCLUSION

There are a number of advantages to the embodiments of the invention when applied to large hierarchical designs. The method of applying CPRR adjustments is flexible in that in that the CPRR adjustment can be applied externally to a block by way of the capture clock and its effect can be seen in the computed slack time. This flexibility is very useful to do a what if analysis with design changes and in making prototypes of circuit designs. Furthermore, the embodiments of the invention are software efficient in that a timer does not have to propagate the CPRR adjustment information. The CPRR adjustment database provides a more efficient method of handling CPRR adjustment with respect to computing time and computer memory requirements. It is quicker and easier to optimize a circuit design by applying CPRR adjustments in the manner utilized by the embodiments of the invention so that there are fewer optimization cycles and the turn around times are reduced. Applying CPRR adjustments in the manner utilized by the embodiments of the invention enables hierarchical timing sign off.

The embodiments of the invention are thus described. While embodiments of the invention have been particularly described, they should not be construed as limited by such embodiments. The embodiments of the invention should be construed according to the claims that follow below.

What is claimed is:

1. A method of analyzing design and timing of an integrated circuit design, the method comprising:
   receiving a first netlist of a first partition block for a top level of a hierarchical design of an integrated circuit, the first partition block including at least one original clock signal with a pair of clock paths having an external common point outside a boundary of the first partition block;
   analyzing the pair of clock paths having the external common point to determine a first clock port and a second clock port associated with a first original clock signal at the boundary of the first partition block;
   for each of the first clock port and the second clock port, creating a launch clock and a capture clock,
      making exclusive clock groups for each of the launch clock for one clock port and the capture clock for the other clock port to avoid the launch clock and the capture clock for each port affecting any other internal data path within the first partition block, and
      associating common path pessimism removal (CPPR) information for the first partition block with a source latency of the capture clock so that timing is adjusted for common path pessimism at an end point of an internal data path;
   and
   wherein one or more of the receiving, the analyzing, the creating, the making, and the associating are performed with a processor.

2. The method of claim 1, further comprising:
   stopping clock paths from the original clock signal to the original clock signal; and
   further for each of the first clock port and the second clock port,
      stopping clock paths from the capture clock to the capture clock.

3. The method of claim 2, further comprising:
   adjusting timing of the internal data path with the associated CPPR information to more accurately analyze timing of the first partition block and the first netlist.

4. The method of claim 1, wherein the first partition block includes an output interface data path clocked by a second original clock signal and the method further includes
   adjusting an output timing delay for the second original clock signal so that timing is adjusted for common path pessimism at an end point of the output interface data path.

5. The method of claim 1, wherein the first partition block includes an input interface data path clocked by a second original clock signal and the method further includes
   adjusting an input timing delay for the second original clock signal so that timing is adjusted for common path pessimism at an end point of the input interface data path.

6. The method of claim 1, wherein the first partition block includes an input interface data path clocked by a second original clock signal and the method further includes
   adjusting an input timing delay for the second original clock signal so that timing is adjusted for common path pessimism at an end point of the input interface data path.

7. The method of claim 1, wherein:
   the analyzing of the pair of clock paths having the external common point includes
      determining a common clock path portion between the pair of clock paths;
      determining the CPPR information for the common clock path portion between the pair of clock paths.

8. The method of claim 7, wherein:
   setup timing of the internal data path is analyzed between clocked storage devices; and
   the CPPR information is positive CPPR information for the common clock path portion between the pair of clock paths.

9. The method of claim 7, wherein:
   hold timing of the internal data path is analyzed between clocked storage devices; and
   the CPPR information is negative CPPR information for the common clock path portion between the pair of clock paths.

10. The method of claim 1, wherein:
    the CPPR information is associated with the source latency of the capture clock by a constraint.

11. A system for designing an integrated circuit, the system comprising:
    a processor to execute instructions; and
    a storage device coupled to the processor, the storage device to store instructions that when executed cause the processor to perform the operations of
       providing a hierarchical common path pessimism removal (CPPR) data base including CPPR adjustment information associated with a source latency of a capture clock of a clock port so that timing can be adjusted for common path pessimism at an end point of an internal data path of one or more partition blocks;
       querying the hierarchical CPPR data base for CPPR adjustment information associated with a clock port of a respective block of the one or more partition blocks; and
       adjusting timing of an internal data path ending at an end point of the respective block in response to the CPPR adjustment information to analyze timing of the respective block.

12. The system of claim 11, wherein
    the storage device to store further instructions that when executed causes the processor to further perform the operations of
       providing an application programming interface (API) into the hierarchical CPPR data base to allow a timing engine to query the hierarchical CPPR data base for the CPPR adjustment information associated with the clock port of the respective block of the one or more partition blocks.

13. The system of claim 11, wherein
the storage device to store further instructions that when executed causes the processor to further perform the operations of
providing a command interface into the hierarchical CPPR data base to allow a first command to set one or more CPPR adjustment values associated with a pair of clock ports and a pair of clocks.

14. The system of claim 13, wherein
the first command further to set a type of timing check and a clock edge of one or both of the pair of clocks.

15. The system of claim 14, wherein
the type of timing check is setup or hold, and
the clock edge is rise or fall.

16. The system of claim 14, wherein
the type of timing check is a setup check of the internal data path between clocked storage devices, and
the CPPR information is positive CPPR information for the common clock path portion between the pair of clock paths.

17. The system of claim 14, wherein
the type of timing check is a hold check of the internal data path between clocked storage devices, and
the CPPR information is negative CPPR information for the common clock path portion between the pair of clock paths.

18. The system of claim 14, wherein
the storage device to store further instructions that when executed causes the processor to further perform the operations of
analyzing a pair of clock paths having an external common point, each of the clock paths extending through a clock port of a partition block.

19. The system of claim 18, wherein
the storage device to store further instructions that when executed causes the processor to further perform the operations of
determining a common clock path portion between the pair of clock paths;
determining the CPPR information for the common clock path portion between the pair of clock paths.

20. A machine readable product comprising a non-transitory machine readable storage device having machine readable instructions stored therein that when executed by a machine causes the machine to perform operations including:
receiving a first netlist of a first partition block for a top level of a hierarchical design of an integrated circuit, the first partition block including at least one original clock signal with a pair of clock paths having an external common point outside a boundary of the first partition block;
analyzing the pair of clock paths having the external common point to determine a first clock port and a second clock port associated with a first original clock signal at the boundary of the first partition block;
for each of the first clock port and the second clock port,
creating a launch clock and a capture clock,
making exclusive clock groups for each of the launch clock for one clock port and the capture clock for the other clock port to avoid the launch clock and the capture clock for each port affecting any other internal data path within the first partition block, and
associating common path pessimism removal (CPPR) information for the first partition block with a source latency of the launch clock so that timing is adjusted for common path pessimism at an end point of an internal data path.

21. The machine readable product of claim 20, wherein the non-transitory machine readable storage device has further machine readable instructions stored therein that when executed by a machine causes the machine to perform the further operations of:
stopping clock paths from the original clock signal to the original clock signal; and
for each of the first clock port and the second clock port,
stopping clock paths from the capture clock to the capture clock.

22. The machine readable product of claim 21, wherein the non-transitory machine readable storage device has further machine readable instructions stored therein that when executed by a machine causes the machine to perform the further operations of:
adjusting timing of the internal data path with the associated CPPR information to more accurately analyze timing of the first partition block and the first netlist.

* * * * *